United States Patent
Hall et al.

(10) Patent No.: US 9,779,379 B2
(45) Date of Patent: Oct. 3, 2017

(54) CONTAINER VERIFICATION THROUGH AN ELECTRICAL RECEPTACLE AND PLUG ASSOCIATED WITH A CONTAINER AND A TRANSPORT VEHICLE OF AN INTERMODAL FREIGHT TRANSPORT SYSTEM

(71) Applicants: Christopher Hall, Knoxville, TN (US); Jason Wright, Knoxville, TN (US); Jionghao Yu, Knoxville, TN (US); Scott Anderson, Knoxville, TN (US); Levi Marshall Baade, San Clemente, CA (US)

(72) Inventors: Christopher Hall, Knoxville, TN (US); Jason Wright, Knoxville, TN (US); Jionghao Yu, Knoxville, TN (US); Scott Anderson, Knoxville, TN (US); Levi Marshall Baade, San Clemente, CA (US)

(73) Assignee: Spireon, Inc., Irvine, CA (US)

(*) Notice: Subject to any disclaimer, the term of this patent is extended or adjusted under 35 U.S.C. 154(b) by 307 days.

(21) Appl. No.: 14/564,083

(22) Filed: Dec. 8, 2014

(65) Prior Publication Data
US 2015/0095255 A1 Apr. 2, 2015

Related U.S. Application Data

(63) Continuation-in-part of application No. 13/898,493, filed on May 21, 2013, now Pat. No. 9,316,737, (Continued)

(51) Int. Cl.
G08B 1/00 (2006.01)
G06Q 10/08 (2012.01)
(Continued)

(52) U.S. Cl.
CPC .......... *G06Q 10/0833* (2013.01); *G01S 19/16* (2013.01); *G06Q 10/08* (2013.01)

(58) Field of Classification Search
CPC ..... G06Q 10/0833; G06Q 10/08; G01S 19/16
(Continued)

(56) References Cited

U.S. PATENT DOCUMENTS 4,067,061 A 1/1978 Juhasz
4,633,407 A 12/1986 Freienstein et al.
(Continued)

FOREIGN PATENT DOCUMENTS

CA 2609106 A1 10/2008
CA 2688263 A1 12/2008
(Continued)

OTHER PUBLICATIONS

"Dynamic Vehicle Detection via the Use of Magnetic Field Sensors", MDPI, Jan. 19, 2016 by Vytautas Markevicius et al. (pp. 9) http://www.mdpi.com/1424-8220/16/1/78/pdf.
(Continued)

*Primary Examiner* — Jack K Wang
(74) *Attorney, Agent, or Firm* — Luedeka Neely Group, PC

(57) ABSTRACT

A method and system related to container identification through an electrical receptacle and plug associated with the container of an intermodal freight transport system is disclosed. According to one embodiment, a method includes coupling an electrical power plug of a container and an electrical power receptacle of a transport vehicle. Also, the method includes activating a tracking device of the container through a switch and actuator coupling. Further, the method includes verifying an identity of the container upon coupling the electrical power plug to the electrical power receptacle through an identification tag of the container and an elec-
(Continued)

tronic reader. Furthermore, the method may include conserving battery power through deactivating the tracking device of the container when the electrical power plug is de-coupled to the electrical power receptacle. The method may also include delivering an alert message to a driver when an incorrect container is identified.

5 Claims, 13 Drawing Sheets

Related U.S. Application Data which is a continuation-in-part of application No. 13/668,698, filed on Nov. 5, 2012, now Pat. No. 8,933,802.

(51) Int. Cl.
G01S 19/16 (2010.01)
G08B 1/08 (2006.01)
G08B 13/08 (2006.01)
G08G 1/123 (2006.01)

(58) Field of Classification Search
USPC .................................................. 340/539.13
See application file for complete search history.

(56) References Cited

U.S. PATENT DOCUMENTS

| | | |
|---|---|---|
| 4,654,821 A | 3/1987 | Lapp |
| 4,663,725 A | 5/1987 | Truckenbrod et al. |
| 4,675,539 A | 6/1987 | Nichol |
| 4,695,946 A | 9/1987 | Andreasen et al. |
| 4,701,845 A | 10/1987 | Andreasen et al. |
| 4,727,360 A | 2/1988 | Ferguson et al. |
| 4,837,700 A | 6/1989 | Ando et al. |
| 4,884,242 A | 11/1989 | Lacy et al. |
| 4,891,650 A | 1/1990 | Sheffer |
| 4,907,150 A | 3/1990 | Arroyo et al. |
| 5,119,301 A | 6/1992 | Shimizu et al. |
| 5,122,959 A | 6/1992 | Nathanson et al. |
| 5,208,756 A | 5/1993 | Song |
| 5,218,367 A | 6/1993 | Sheffer et al. |
| 5,223,844 A | 6/1993 | Mansell et al. |
| 5,276,865 A | 1/1994 | Thorpe |
| 5,289,369 A | 2/1994 | Hirshberg |
| 5,299,132 A | 3/1994 | Wortham |
| 5,307,277 A | 4/1994 | Hirano |
| 5,390,125 A | 2/1995 | Sennott et al. |
| 5,408,411 A | 4/1995 | Nakamura et al. |
| 5,424,952 A | 6/1995 | Asayama |
| 5,457,439 A | 10/1995 | Kuhn |
| 5,515,419 A | 5/1996 | Sheffer |
| 5,521,579 A | 5/1996 | Bernhard |
| 5,610,815 A | 3/1997 | Gudat et al. |
| 5,684,474 A | 11/1997 | Gilon et al. |
| 5,686,888 A | 11/1997 | Welles, II et al. |
| 5,708,820 A | 1/1998 | Park et al. |
| 5,712,789 A | 1/1998 | Radican |
| 5,751,245 A | 5/1998 | Janky et al. |
| 5,805,103 A | 9/1998 | Doi et al. |
| 5,867,804 A | 2/1999 | Pilley et al. |
| 5,870,029 A | 2/1999 | Otto et al. |
| 5,877,956 A | 3/1999 | Frank et al. |
| 5,917,433 A | 6/1999 | Keillor et al. |
| 5,923,243 A | 7/1999 | Bleiner |
| 5,949,974 A | 9/1999 | Ewing et al. |
| 5,978,236 A | 11/1999 | Faberman et al. |
| 6,029,111 A | 2/2000 | Croyle |
| 6,067,044 A | 5/2000 | Whelan et al. |
| 6,075,441 A | 6/2000 | Maloney |
| 6,091,323 A | 7/2000 | Kawai |
| 6,148,291 A | 11/2000 | Radican |
| 6,154,152 A | 11/2000 | Ito |
| 6,181,029 B1 | 1/2001 | Berglund et al. |
| 6,202,023 B1 | 3/2001 | Hancock et al. |
| 6,204,764 B1 | 3/2001 | Maloney |
| 6,226,389 B1 | 5/2001 | Lemelson et al. |
| 6,233,563 B1 | 5/2001 | Jefferson et al. |
| 6,240,365 B1 | 5/2001 | Bunn |
| 6,249,217 B1 | 6/2001 | Forbes |
| 6,266,008 B1 | 7/2001 | Huston et al. |
| 6,275,773 B1 | 8/2001 | Lemelson et al. |
| 6,317,693 B2 | 11/2001 | Kodaka et al. |
| 6,338,011 B1 | 1/2002 | Furst et al. |
| 6,339,369 B1 | 1/2002 | Paranjpe |
| 6,339,745 B1 | 1/2002 | Novik |
| 6,363,320 B1 | 3/2002 | Chou |
| 6,385,539 B1 | 5/2002 | Wilson et al. |
| 6,388,580 B1 | 5/2002 | Graham |
| 6,393,582 B1 | 5/2002 | Klecka et al. |
| 6,393,584 B1 | 5/2002 | McLaren et al. |
| 6,415,227 B1 | 7/2002 | Lin |
| 6,483,434 B1 | 11/2002 | Umiker |
| 6,502,080 B1 | 12/2002 | Eichorst et al. |
| 6,510,381 B2 | 1/2003 | Grounds et al. |
| 6,512,465 B2 | 1/2003 | Flick |
| 6,577,921 B1 | 6/2003 | Carson |
| 6,584,403 B2 | 6/2003 | Bunn |
| 6,701,234 B1 | 3/2004 | Vogelsang |
| 6,704,810 B1 | 3/2004 | Krehbiel, Jr. et al. |
| 6,714,857 B2 | 3/2004 | Kapolka et al. |
| 6,717,527 B2 | 4/2004 | Simon |
| 6,720,920 B2 | 4/2004 | Breed et al. |
| 6,737,963 B2 | 5/2004 | Gutta et al. |
| 6,748,320 B2 | 6/2004 | Jones |
| 6,771,970 B1 | 8/2004 | Dan |
| 6,816,090 B2 | 11/2004 | Teckchandani et al. |
| 6,832,153 B2 | 12/2004 | Thayer et al. |
| 6,844,827 B2 | 1/2005 | Flick |
| 6,856,902 B1 | 2/2005 | Mitchem |
| 6,871,137 B2 | 3/2005 | Scaer et al. |
| 6,873,963 B1 | 3/2005 | Westbury et al. |
| 6,904,359 B2 | 6/2005 | Jones |
| 6,930,638 B2 | 8/2005 | Lloyd et al. |
| 6,931,309 B2 | 8/2005 | Phelan et al. |
| 6,985,087 B2 | 1/2006 | Soliman |
| 7,035,856 B1 | 4/2006 | Morimoto |
| 7,039,520 B2 | 5/2006 | Draeger et al. |
| 7,065,445 B2 | 6/2006 | Thayer et al. |
| 7,072,764 B2 | 7/2006 | Donath et al. |
| 7,091,835 B2 | 8/2006 | Boulay et al. |
| 7,096,392 B2 | 8/2006 | Sim-Tang |
| 7,099,934 B1 | 8/2006 | Ewing et al. |
| 7,154,390 B2 | 12/2006 | Giermanski et al. |
| 7,170,390 B2 | 1/2007 | Quinones et al. |
| 7,174,243 B1 | 2/2007 | Lightner et al. |
| 7,177,738 B2 | 2/2007 | Diaz |
| 7,212,134 B2 | 5/2007 | Taylor |
| 7,215,255 B2 | 5/2007 | Grush |
| 7,242,303 B2 | 7/2007 | Patel et al. |
| 7,253,731 B2 | 8/2007 | Joao |
| 7,266,378 B2 | 9/2007 | Norta et al. |
| 7,283,046 B2 | 10/2007 | Culpepper et al. |
| 7,289,019 B1 | 10/2007 | Kertes |
| 7,302,344 B2 | 11/2007 | Olney et al. |
| 7,308,611 B2 | 12/2007 | Booth |
| 7,327,238 B2 | 2/2008 | Bhogal et al. |
| 7,339,469 B2 | 3/2008 | Braun |
| 7,343,306 B1 | 3/2008 | Bates et al. |
| 7,346,439 B2 | 3/2008 | Bodin |
| 7,346,790 B1 | 3/2008 | Klein |
| 7,405,658 B2 | 7/2008 | Richards |
| 7,446,649 B2 | 11/2008 | Bhogal et al. |
| 7,455,225 B1 | 11/2008 | Hadfield et al. |
| 7,467,325 B2 | 12/2008 | Eisen et al. |
| 7,472,202 B2 | 12/2008 | Parupudi et al. |
| 7,479,877 B2 | 1/2009 | Mortenson et al. |
| 7,486,176 B2 | 2/2009 | Bhogal et al. |
| 7,489,993 B2 | 2/2009 | Coffee et al. |
| 7,527,288 B2 | 5/2009 | Breed |
| 7,552,008 B2 | 6/2009 | Newstrom et al. |

(56) References Cited

U.S. PATENT DOCUMENTS

| | | |
|---|---|---|
| 7,555,370 B2 | 6/2009 | Breed et al. |
| 7,571,051 B1 | 8/2009 | Shulman |
| 7,574,195 B2 | 8/2009 | Krasner et al. |
| 7,580,782 B2 | 8/2009 | Breed et al. |
| 7,593,999 B2 | 9/2009 | Nathanson |
| 7,600,150 B2 | 10/2009 | Wu |
| 7,617,037 B2 | 11/2009 | Desens et al. |
| 7,650,210 B2 | 1/2010 | Breed |
| 7,652,568 B2 | 1/2010 | Waugh et al. |
| 7,657,354 B2 | 2/2010 | Breed et al. |
| 7,668,931 B2 | 2/2010 | Parupudi et al. |
| 7,672,756 B2 | 3/2010 | Breed |
| 7,693,626 B2 | 4/2010 | Breed et al. |
| 7,701,363 B1 | 4/2010 | Zlojutro |
| 7,725,216 B2 | 5/2010 | Kim |
| 7,746,228 B2 | 6/2010 | Sensenig et al. |
| 7,751,944 B2 | 7/2010 | Parupudi et al. |
| 7,755,541 B2 | 7/2010 | Wisherd et al. |
| 7,769,499 B2 | 8/2010 | McQuade et al. |
| 7,774,633 B1 | 8/2010 | Harrenstien et al. |
| 7,817,033 B2 | 10/2010 | Motoyama |
| 7,876,239 B2 | 1/2011 | Horstemeyer |
| 7,893,818 B2 | 2/2011 | Smoyer et al. |
| 7,899,591 B2 | 3/2011 | Shah et al. |
| 7,899,621 B2 | 3/2011 | Breed et al. |
| 7,916,026 B2 | 3/2011 | Johnson et al. |
| 7,950,570 B2 | 5/2011 | Marchasin et al. |
| 7,971,095 B2 | 6/2011 | Hess et al. |
| 7,987,017 B2 | 7/2011 | Buzzoni et al. |
| 8,009,034 B2 | 8/2011 | Dobson et al. |
| 8,009,086 B2 | 8/2011 | Grossnickle et al. |
| 8,095,304 B2 | 1/2012 | Blanton et al. |
| 8,103,450 B2 | 1/2012 | Takaoka |
| 8,103,741 B2 | 1/2012 | Frazier et al. |
| 8,106,757 B2 | 1/2012 | Brinton et al. |
| 8,111,154 B1 | 2/2012 | Puri et al. |
| 8,126,601 B2 | 2/2012 | Kapp et al. |
| 8,181,868 B2 | 5/2012 | Thomas et al. |
| 8,185,767 B2 | 5/2012 | Ballou et al. |
| 8,201,009 B2 | 6/2012 | Sun et al. |
| 8,237,591 B2 | 8/2012 | Holcomb et al. |
| 8,255,144 B2 | 8/2012 | Breed et al. |
| 8,279,067 B2 | 10/2012 | Berger et al. |
| 8,299,920 B2 | 10/2012 | Hamm et al. |
| 8,306,687 B2 | 11/2012 | Chen |
| 8,311,858 B2 | 11/2012 | Everett et al. |
| 8,326,813 B2 | 12/2012 | Nizami et al. |
| 8,330,626 B1 | 12/2012 | Adelson |
| 8,330,817 B1 | 12/2012 | Foster |
| 8,368,561 B2 | 2/2013 | Welch et al. |
| 8,380,426 B2 | 2/2013 | Konijnendijk |
| 8,398,405 B2 | 3/2013 | Kumar |
| 8,407,139 B1 | 3/2013 | Palmer |
| 8,452,771 B2 | 5/2013 | Kurciska et al. |
| 8,462,021 B2 | 6/2013 | Welch et al. |
| 8,467,324 B2 | 6/2013 | Yousefi et al. |
| 8,489,907 B2 | 7/2013 | Wakrat et al. |
| 8,502,661 B2 | 8/2013 | Mauro et al. |
| 8,504,233 B1 | 8/2013 | Ferguson et al. |
| 8,504,512 B2 | 8/2013 | Herzog et al. |
| 8,510,200 B2 | 8/2013 | Pearlman et al. |
| 8,527,135 B2 | 9/2013 | Lowrey et al. |
| 8,565,963 B2 | 10/2013 | Burke, Jr. |
| 8,587,430 B2 | 11/2013 | Ferguson et al. |
| 8,612,137 B2 | 12/2013 | Harris et al. |
| 8,626,152 B2 | 1/2014 | Farrell et al. |
| 8,655,544 B2 | 2/2014 | Fletcher et al. |
| 8,655,983 B1 | 2/2014 | Harris et al. |
| 8,671,063 B2 | 3/2014 | Ehrman et al. |
| 8,700,249 B1 | 4/2014 | Carrithers |
| 8,718,536 B2 | 5/2014 | Hannon |
| 8,725,326 B2 | 5/2014 | Kapp et al. |
| 8,725,342 B2 | 5/2014 | Ferguson et al. |
| 8,762,009 B2 | 6/2014 | Ehrman et al. |
| 8,766,797 B2 | 7/2014 | Hamm et al. |
| 8,770,480 B2 | 7/2014 | Gulli |
| 8,781,169 B2 | 7/2014 | Jackson et al. |
| 8,781,958 B2 | 7/2014 | Michael |
| 8,799,461 B2 | 8/2014 | Herz et al. |
| 8,839,026 B2 | 9/2014 | Kopylovitz |
| 8,933,802 B2 | 1/2015 | Baade |
| 8,970,701 B2 | 3/2015 | Lao |
| 9,049,564 B2 | 6/2015 | Muetzel et al. |
| 2001/0006398 A1 | 7/2001 | Nakamura et al. |
| 2001/0018628 A1 | 8/2001 | Jenkins et al. |
| 2001/0018639 A1 | 8/2001 | Bunn |
| 2001/0034577 A1 | 10/2001 | Grounds et al. |
| 2001/0037298 A1 | 11/2001 | Ehrman et al. |
| 2002/0000916 A1 | 1/2002 | Richards |
| 2002/0014978 A1 | 2/2002 | Flick |
| 2002/0059126 A1 | 5/2002 | Ricciardi |
| 2002/0070891 A1 | 6/2002 | Huston et al. |
| 2002/0082025 A1 | 6/2002 | Baese et al. |
| 2002/0184062 A1 | 12/2002 | Diaz |
| 2002/0186144 A1 | 12/2002 | Meunier |
| 2002/0198632 A1 | 12/2002 | Breed et al. |
| 2003/0009361 A1 | 1/2003 | Hancock et al. |
| 2003/0013146 A1 | 1/2003 | Werb |
| 2003/0018428 A1 | 1/2003 | Knockeart et al. |
| 2003/0023614 A1 | 1/2003 | Newstrom et al. |
| 2003/0055542 A1 | 3/2003 | Knockeart et al. |
| 2003/0055553 A1 | 3/2003 | Knockeart et al. |
| 2003/0083060 A1 | 5/2003 | Menendez |
| 2003/0125855 A1 | 7/2003 | Breed et al. |
| 2003/0151501 A1 | 8/2003 | Teckchandani et al. |
| 2003/0151507 A1 | 8/2003 | Andre et al. |
| 2003/0158638 A1 | 8/2003 | Yakes et al. |
| 2003/0158639 A1 | 8/2003 | Nada |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0174067 A1 | 9/2003 | Soliman |
| 2003/0176959 A1 | 9/2003 | Breed |
| 2003/0191567 A1 | 10/2003 | Gentilcore |
| 2003/0191568 A1 | 10/2003 | Breed |
| 2003/0204407 A1 | 10/2003 | Nabors et al. |
| 2003/0233189 A1* | 12/2003 | Hsiao .............. G08G 1/20 701/521 |
| 2004/0006398 A1 | 1/2004 | Bickford |
| 2004/0006413 A1 | 1/2004 | Kane et al. |
| 2004/0049337 A1 | 3/2004 | Knockeart et al. |
| 2004/0056797 A1 | 3/2004 | Knockeart et al. |
| 2004/0093291 A1 | 5/2004 | Bodin |
| 2004/0102895 A1 | 5/2004 | Thayer et al. |
| 2004/0102896 A1 | 5/2004 | Thayer et al. |
| 2004/0130440 A1 | 7/2004 | Boulay et al. |
| 2004/0143378 A1 | 7/2004 | Vogelsang |
| 2004/0162063 A1 | 8/2004 | Quinones et al. |
| 2004/0199285 A1 | 10/2004 | Berichon et al. |
| 2004/0199302 A1 | 10/2004 | Pillar et al. |
| 2004/0204969 A1 | 10/2004 | Wu |
| 2004/0225557 A1 | 11/2004 | Phelan et al. |
| 2004/0246177 A1 | 12/2004 | Lloyd et al. |
| 2005/0004748 A1 | 1/2005 | Pinto et al. |
| 2005/0007450 A1 | 1/2005 | Hill et al. |
| 2005/0021199 A1 | 1/2005 | Zimmerman et al. |
| 2005/0021722 A1 | 1/2005 | Metzger |
| 2005/0043879 A1 | 2/2005 | Desens et al. |
| 2005/0060069 A1 | 3/2005 | Breed et al. |
| 2005/0080565 A1 | 4/2005 | Olney et al. |
| 2005/0114023 A1 | 5/2005 | Williamson et al. |
| 2005/0131597 A1 | 6/2005 | Raz et al. |
| 2005/0134504 A1 | 6/2005 | Harwood et al. |
| 2005/0149251 A1 | 7/2005 | Donath et al. |
| 2005/0171798 A1 | 8/2005 | Croft et al. |
| 2005/0216294 A1 | 9/2005 | Labow |
| 2005/0237166 A1 | 10/2005 | Chen |
| 2006/0041341 A1 | 2/2006 | Kane et al. |
| 2006/0041342 A1 | 2/2006 | Kane et al. |
| 2006/0052913 A1 | 3/2006 | Kane et al. |
| 2006/0053075 A1 | 3/2006 | Roth et al. |
| 2006/0055561 A1 | 3/2006 | Kamali et al. |
| 2006/0074558 A1 | 4/2006 | Williamson et al. |

(56) References Cited

U.S. PATENT DOCUMENTS

| | | |
|---|---|---|
| 2006/0087411 A1 | 4/2006 | Chang |
| 2006/0089786 A1 | 4/2006 | Soehren |
| 2006/0109106 A1 | 5/2006 | Braun |
| 2006/0129290 A1 | 6/2006 | Zimmerman et al. |
| 2006/0155427 A1 | 7/2006 | Yang |
| 2006/0155434 A1 | 7/2006 | Kane et al. |
| 2006/0187026 A1 | 8/2006 | Kochis |
| 2006/0253234 A1 | 11/2006 | Kane et al. |
| 2006/0273922 A1 | 12/2006 | Bhogal et al. |
| 2007/0005202 A1 | 1/2007 | Breed |
| 2007/0027726 A1 | 2/2007 | Warren et al. |
| 2007/0057781 A1 | 3/2007 | Breed |
| 2007/0061054 A1 | 3/2007 | Rowe et al. |
| 2007/0061076 A1 | 3/2007 | Shulman |
| 2007/0086624 A1 | 4/2007 | Breed et al. |
| 2007/0087756 A1 | 4/2007 | Hoffberg |
| 2007/0096565 A1 | 5/2007 | Breed et al. |
| 2007/0096899 A1 | 5/2007 | Johnson |
| 2007/0115101 A1 | 5/2007 | Creekbaum et al. |
| 2007/0135984 A1 | 6/2007 | Breed et al. |
| 2007/0139216 A1 | 6/2007 | Breed |
| 2007/0156317 A1 | 7/2007 | Breed |
| 2007/0159354 A1 | 7/2007 | Rosenberg |
| 2007/0162550 A1 | 7/2007 | Rosenberg |
| 2007/0167147 A1 | 7/2007 | Krasner et al. |
| 2007/0185625 A1 | 8/2007 | Pillar et al. |
| 2007/0200690 A1 | 8/2007 | Bhogal et al. |
| 2007/0239322 A1 | 10/2007 | McQuade et al. |
| 2007/0244614 A1 | 10/2007 | Nathanson |
| 2007/0285240 A1 | 12/2007 | Sensenig et al. |
| 2007/0290836 A1 | 12/2007 | Ainsworth et al. |
| 2007/0290923 A1 | 12/2007 | Norta et al. |
| 2008/0015748 A1 | 1/2008 | Nagy |
| 2008/0036187 A1 | 2/2008 | Breed |
| 2008/0040004 A1 | 2/2008 | Breed |
| 2008/0040005 A1 | 2/2008 | Breed |
| 2008/0040023 A1 | 2/2008 | Breed et al. |
| 2008/0040268 A1 | 2/2008 | Corn |
| 2008/0042875 A1 | 2/2008 | Harrington et al. |
| 2008/0046150 A1 | 2/2008 | Breed |
| 2008/0051957 A1 | 2/2008 | Breed et al. |
| 2008/0051995 A1 | 2/2008 | Lokshin et al. |
| 2008/0061953 A1 | 3/2008 | Bhogal et al. |
| 2008/0061963 A1* | 3/2008 | Schnitz ............... G06Q 10/08 340/539.13 |
| 2008/0065291 A1 | 3/2008 | Breed |
| 2008/0077285 A1 | 3/2008 | Kumar et al. |
| 2008/0077326 A1 | 3/2008 | Funk et al. |
| 2008/0091350 A1 | 4/2008 | Smith et al. |
| 2008/0111546 A1 | 5/2008 | Takahashi et al. |
| 2008/0119993 A1 | 5/2008 | Breed |
| 2008/0143523 A1* | 6/2008 | Ekstrom ............... B65D 90/00 340/545.6 |
| 2008/0147265 A1 | 6/2008 | Breed |
| 2008/0147280 A1 | 6/2008 | Breed |
| 2008/0157510 A1 | 7/2008 | Breed et al. |
| 2008/0162045 A1 | 7/2008 | Lee |
| 2008/0167821 A1 | 7/2008 | Breed |
| 2008/0176537 A1 | 7/2008 | Smoyer et al. |
| 2008/0183344 A1 | 7/2008 | Doyen et al. |
| 2008/0183376 A1 | 7/2008 | Knockeart et al. |
| 2008/0195261 A1 | 8/2008 | Breed |
| 2008/0195432 A1 | 8/2008 | Fell et al. |
| 2008/0215190 A1 | 9/2008 | Pillar et al. |
| 2008/0234933 A1 | 9/2008 | Chowdhary et al. |
| 2008/0235105 A1 | 9/2008 | Payne et al. |
| 2008/0252431 A1 | 10/2008 | Nigam |
| 2008/0262669 A1 | 10/2008 | Smid et al. |
| 2008/0278314 A1 | 11/2008 | Miller et al. |
| 2008/0294302 A1 | 11/2008 | Basir |
| 2008/0318547 A1 | 12/2008 | Ballou, Jr. et al. |
| 2009/0033494 A1 | 2/2009 | Malik |
| 2009/0079591 A1 | 3/2009 | Motoyama |
| 2009/0082918 A1 | 3/2009 | Hendrix, Jr. |
| 2009/0112394 A1 | 4/2009 | Lepejian et al. |
| 2009/0138497 A1 | 5/2009 | Zavoli et al. |
| 2009/0140887 A1 | 6/2009 | Breed et al. |
| 2009/0177378 A1 | 7/2009 | Kamalski et al. |
| 2009/0189788 A1* | 7/2009 | Faus ..................... G08B 25/08 340/989 |
| 2009/0261975 A1 | 10/2009 | Ferguson et al. |
| 2009/0273489 A1 | 11/2009 | Lu |
| 2009/0326808 A1 | 12/2009 | Blanton et al. |
| 2010/0036793 A1 | 2/2010 | Willis et al. |
| 2010/0049669 A1 | 2/2010 | Mazzarolo |
| 2010/0057279 A1 | 3/2010 | Kyllingstad |
| 2010/0057305 A1 | 3/2010 | Breed |
| 2010/0071572 A1 | 3/2010 | Carroll et al. |
| 2010/0076878 A1 | 3/2010 | Burr et al. |
| 2010/0082195 A1 | 4/2010 | Lee et al. |
| 2010/0094482 A1 | 4/2010 | Schofield et al. |
| 2010/0094500 A1 | 4/2010 | Jin |
| 2010/0117868 A1 | 5/2010 | Van Wiemeersch et al. |
| 2010/0127867 A1 | 5/2010 | Chien et al. |
| 2010/0152972 A1 | 6/2010 | Attard et al. |
| 2010/0169009 A1 | 7/2010 | Breed et al. |
| 2010/0174487 A1 | 7/2010 | Soehren |
| 2010/0191412 A1 | 7/2010 | Kim |
| 2010/0207754 A1 | 8/2010 | Shostak et al. |
| 2010/0250411 A1 | 9/2010 | Ogrodski |
| 2010/0265104 A1 | 10/2010 | Zlojutro |
| 2010/0274415 A1 | 10/2010 | Lam |
| 2010/0332080 A1 | 12/2010 | Bae |
| 2010/0332118 A1 | 12/2010 | Geelen et al. |
| 2010/0332363 A1 | 12/2010 | Duddle et al. |
| 2011/0016340 A1 | 1/2011 | Sun et al. |
| 2011/0060496 A1 | 3/2011 | Nielsen et al. |
| 2011/0071750 A1 | 3/2011 | Giovino et al. |
| 2011/0078089 A1 | 3/2011 | Hamm et al. |
| 2011/0090075 A1 | 4/2011 | Armitage et al. |
| 2011/0090399 A1 | 4/2011 | Whitaker et al. |
| 2011/0106337 A1 | 5/2011 | Patel et al. |
| 2011/0137489 A1 | 6/2011 | Gilleland et al. |
| 2011/0140877 A1 | 6/2011 | Gilchrist et al. |
| 2011/0143669 A1 | 6/2011 | Farrell et al. |
| 2011/0166773 A1 | 7/2011 | Raz et al. |
| 2011/0181391 A1 | 7/2011 | Chu |
| 2011/0196580 A1 | 8/2011 | Xu et al. |
| 2011/0221573 A1 | 9/2011 | Huat |
| 2011/0257880 A1 | 10/2011 | Watanabe et al. |
| 2011/0270772 A1 | 11/2011 | Hall et al. |
| 2011/0275388 A1 | 11/2011 | Haney |
| 2011/0276215 A1* | 11/2011 | Wendling ........... B60G 17/0152 701/31.4 |
| 2012/0029818 A1 | 2/2012 | Smith et al. |
| 2012/0041618 A1 | 2/2012 | Sun et al. |
| 2012/0075088 A1 | 3/2012 | Marentes Aguilar |
| 2012/0077475 A1 | 3/2012 | Holcomb et al. |
| 2012/0078497 A1 | 3/2012 | Burke, Jr. |
| 2012/0089328 A1 | 4/2012 | Ellanti et al. |
| 2012/0089686 A1 | 4/2012 | Meister |
| 2012/0106446 A1 | 5/2012 | Yousefi et al. |
| 2012/0106801 A1 | 5/2012 | Jackson |
| 2012/0123806 A1 | 5/2012 | Schumann, Jr. et al. |
| 2012/0166018 A1 | 6/2012 | Larschan et al. |
| 2012/0191329 A1 | 7/2012 | Roessle et al. |
| 2012/0197484 A1 | 8/2012 | Nath et al. |
| 2012/0218129 A1 | 8/2012 | Burns |
| 2012/0232945 A1 | 9/2012 | Tong |
| 2012/0249326 A1 | 10/2012 | Mostov |
| 2012/0252488 A1 | 10/2012 | Hartmann et al. |
| 2012/0253861 A1 | 10/2012 | Davidson et al. |
| 2012/0268260 A1 | 10/2012 | Miller et al. |
| 2012/0303237 A1 | 11/2012 | Kumar et al. |
| 2012/0323767 A1 | 12/2012 | Michael |
| 2012/0323771 A1 | 12/2012 | Michael |
| 2012/0323772 A1 | 12/2012 | Michael |
| 2013/0031318 A1 | 1/2013 | Chen et al. |
| 2013/0031345 A1 | 1/2013 | Kung |
| 2013/0035827 A1 | 2/2013 | Breed |
| 2013/0057397 A1 | 3/2013 | Cutler et al. |
| 2013/0059607 A1 | 3/2013 | Herz et al. |
| 2013/0061044 A1 | 3/2013 | Pinkus et al. |
| 2013/0066757 A1 | 3/2013 | Lovelace et al. |

(56) References Cited

U.S. PATENT DOCUMENTS

| | | |
|---|---|---|
| 2013/0069390 A1 | 3/2013 | Foster |
| 2013/0097458 A1 | 4/2013 | Sekino et al. |
| 2013/0100286 A1 | 4/2013 | Lao |
| 2013/0113637 A1 | 5/2013 | Sin et al. |
| 2013/0131928 A1 | 5/2013 | Bolton et al. |
| 2013/0138251 A1 | 5/2013 | Thogersen et al. |
| 2013/0144667 A1 | 6/2013 | Ehrman et al. |
| 2013/0144770 A1 | 6/2013 | Boling et al. |
| 2013/0144771 A1 | 6/2013 | Boling et al. |
| 2013/0144805 A1 | 6/2013 | Boling et al. |
| 2013/0159214 A1 | 6/2013 | Boling et al. |
| 2013/0166198 A1 | 6/2013 | Funk et al. |
| 2013/0179034 A1 | 7/2013 | Pryor |
| 2013/0185193 A1 | 7/2013 | Boling et al. |
| 2013/0185221 A1 | 7/2013 | Adams et al. |
| 2013/0218369 A1 | 8/2013 | Yoshihama et al. |
| 2013/0218461 A1 | 8/2013 | Naimark |
| 2013/0222133 A1 | 8/2013 | Schultz et al. |
| 2013/0249713 A1 | 9/2013 | Adelson |
| 2013/0250933 A1 | 9/2013 | Yousefi et al. |
| 2013/0253732 A1 | 9/2013 | Patel et al. |
| 2013/0253734 A1 | 9/2013 | Kaap et al. |
| 2013/0253754 A1 | 9/2013 | Ferguson et al. |
| 2013/0297199 A1 | 11/2013 | Kapp et al. |
| 2013/0302757 A1 | 11/2013 | Pearlman et al. |
| 2013/0311077 A1 | 11/2013 | Ichida |
| 2013/0332070 A1 | 12/2013 | Fleizach et al. |
| 2014/0012438 A1 | 1/2014 | Shoppa et al. |
| 2014/0012510 A1 | 1/2014 | Mensinger et al. |
| 2014/0012511 A1 | 1/2014 | Mensinger et al. |
| 2014/0012634 A1 | 1/2014 | Pearlman et al. |
| 2014/0025229 A1 | 1/2014 | Levien et al. |
| 2014/0025230 A1 | 1/2014 | Levien et al. |
| 2014/0025233 A1 | 1/2014 | Levien et al. |
| 2014/0025234 A1 | 1/2014 | Levien et al. |
| 2014/0025235 A1 | 1/2014 | Levien et al. |
| 2014/0025236 A1 | 1/2014 | Levien et al. |
| 2014/0025284 A1 | 1/2014 | Roberts |
| 2014/0036072 A1* | 2/2014 | Lyall ............... G06K 9/00771 348/143 |
| 2014/0052366 A1 | 2/2014 | Rothschild |
| 2014/0052605 A1 | 2/2014 | Beerle et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0058805 A1 | 2/2014 | Paesler et al. |
| 2014/0067160 A1 | 3/2014 | Levien et al. |
| 2014/0067167 A1 | 3/2014 | Levien et al. |
| 2014/0074692 A1 | 3/2014 | Beerle et al. |
| 2014/0077285 A1 | 3/2014 | Noda et al. |
| 2014/0077326 A1 | 3/2014 | Koshino et al. |
| 2014/0091350 A1 | 4/2014 | Katsuno et al. |
| 2014/0095061 A1 | 4/2014 | Hyde |
| 2014/0111546 A1 | 4/2014 | Utagawa |
| 2014/0119993 A1 | 5/2014 | Rhodes |
| 2014/0125500 A1 | 5/2014 | Baade |
| 2014/0125501 A1 | 5/2014 | Baade |
| 2014/0129426 A1 | 5/2014 | Lamb et al. |
| 2014/0143169 A1 | 5/2014 | Lozito |
| 2014/0147280 A1 | 5/2014 | Kowatsch |
| 2014/0157510 A1 | 6/2014 | Mjelde |
| 2014/0167821 A1 | 6/2014 | Yang et al. |
| 2014/0180567 A1 | 6/2014 | Fetsch |
| 2014/0183376 A1 | 7/2014 | Perkins |
| 2014/0195261 A1 | 7/2014 | Rasquinha et al. |
| 2014/0201064 A1 | 7/2014 | Jackson et al. |
| 2014/0210503 A1 | 7/2014 | Tam |
| 2014/0215190 A1 | 7/2014 | Mylius et al. |
| 2014/0220966 A1 | 8/2014 | Muetzel et al. |
| 2014/0267688 A1 | 9/2014 | Aich et al. |
| 2015/0006207 A1 | 1/2015 | Jarvis et al. |
| 2015/0019270 A1 | 1/2015 | Jarvis et al. |
| 2015/0024727 A1 | 1/2015 | Hale-Pletka et al. |
| 2015/0032291 A1 | 1/2015 | Lowrey et al. |
| 2015/0066362 A1 | 3/2015 | Meyer et al. |
| 2015/0067312 A1 | 3/2015 | Lewandowski et al. |
| 2015/0168173 A1 | 6/2015 | Lewis-Evans et al. |
| 2015/0260529 A1 | 9/2015 | Petersen |
| 2015/0332525 A1 | 11/2015 | Harris et al. |

FOREIGN PATENT DOCUMENTS

| | | |
|---|---|---|
| CA | 2709740 A1 | 7/2009 |
| CA | 2712576 A1 | 2/2011 |
| CA | 2828835 A1 | 4/2014 |
| CA | 2832185 A1 | 5/2014 |
| CN | 2921908 Y | 7/2007 |
| CN | 101192322 A | 6/2008 |
| CN | 101240734 A | 8/2008 |
| CN | 101734228 A | 6/2010 |
| CN | 102779407 A | 11/2012 |
| CN | 103813477 A | 5/2014 |
| CN | 104931066 A | 9/2015 |
| DE | 4423328 A1 | 1/1996 |
| EP | 0096252 A2 | 12/1983 |
| EP | 0393935 A2 | 10/1990 |
| EP | 0451482 A1 | 10/1991 |
| EP | 0519630 A2 | 12/1992 |
| EP | 0744727 A2 | 11/1996 |
| EP | 0581558 B1 | 4/1997 |
| EP | 0795760 A3 | 4/1999 |
| EP | 0806632 B1 | 4/1999 |
| EP | 0660083 B1 | 9/2000 |
| EP | 0795700 B1 | 11/2001 |
| EP | 1191500 A1 | 3/2002 |
| EP | 0767448 B1 | 12/2002 |
| EP | 0785132 B1 | 5/2003 |
| EP | 1324241 A1 | 7/2003 |
| EP | 1384635 A1 | 1/2004 |
| EP | 0763713 B1 | 5/2004 |
| EP | 1752949 A1 | 2/2007 |
| EP | 1777541 A1 | 4/2007 |
| EP | 1785744 A1 | 5/2007 |
| EP | 1791101 B1 | 2/2008 |
| EP | 1912191 A1 | 4/2008 |
| EP | 1944190 A1 | 7/2008 |
| EP | 1760655 A3 | 9/2008 |
| EP | 2000889 A2 | 12/2008 |
| EP | 1870788 B1 | 10/2009 |
| EP | 1894779 B1 | 11/2009 |
| EP | 1975563 A3 | 11/2009 |
| EP | 1975565 A3 | 11/2009 |
| EP | 1804223 B1 | 12/2009 |
| EP | 1927961 B1 | 1/2010 |
| EP | 2154026 A1 | 2/2010 |
| EP | 2339562 A1 | 6/2011 |
| EP | 2418461 A1 | 2/2012 |
| EP | 2528043 A1 | 11/2012 |
| EP | 1975566 A3 | 12/2012 |
| EP | 1742083 B1 | 1/2013 |
| EP | 1895273 A3 | 1/2013 |
| EP | 2747004 A1 | 6/2014 |
| JP | 2006123891 A | 5/2006 |
| JP | 2014170000 A | 9/2014 |
| WO | 8401823 A1 | 5/1984 |
| WO | 9834314 A1 | 8/1998 |
| WO | 9963357 A1 | 12/1999 |
| WO | 0070530 A1 | 11/2000 |
| WO | 0124393 A1 | 4/2001 |
| WO | 0159601 A1 | 8/2001 |
| WO | 0175472 A2 | 10/2001 |
| WO | 0219683 A1 | 3/2002 |
| WO | 02089077 A1 | 11/2002 |
| WO | 03012473 A1 | 2/2003 |
| WO | 03034089 A2 | 4/2003 |
| WO | 03036462 A1 | 5/2003 |
| WO | 03079717 A2 | 9/2003 |
| WO | 2004009473 A1 | 1/2004 |
| WO | 2004051594 A2 | 6/2004 |
| WO | 2007075090 A1 | 9/2004 |
| WO | 2004086076 A2 | 10/2004 |
| WO | 2004102536 A2 | 11/2004 |
| WO | 2005008603 A1 | 1/2005 |
| WO | 2006053566 A1 | 5/2006 |

(56) References Cited

FOREIGN PATENT DOCUMENTS

| WO | 2008034097 A2 | 3/2008 |
|---|---|---|
| WO | 2008118578 A2 | 10/2008 |
| WO | 2008141456 A1 | 11/2008 |
| WO | 2009058972 A2 | 5/2009 |
| WO | 2009080070 A1 | 7/2009 |
| WO | 2009097595 A1 | 8/2009 |
| WO | 2009112305 A1 | 9/2009 |
| WO | 2009158469 A1 | 12/2009 |
| WO | 2011011544 A1 | 1/2011 |
| WO | 2011037766 A2 | 3/2011 |
| WO | 2011037800 A2 | 3/2011 |
| WO | 2011070534 A2 | 6/2011 |
| WO | 2013016581 A1 | 1/2013 |
| WO | 2014008752 A1 | 1/2014 |
| WO | 2014062668 A1 | 4/2014 |

OTHER PUBLICATIONS

"Accuracy and Resource Consumption in Tracking and Location Prediction", 8th International Symposium, Jul. 2003 by Ouri Wolfson et al. (pp. 4) http://link.springer.com/chapter/10.1007/978-3-540-45072-6_19.

"A Heuristic Moving Vehicle Location Prediction Technique via Optimal Paths Selection With Aid of Genetic Algorithm and Feed Forward Back Propagation Neural Network", Journal of Computer Science, Dec. 12, 2012 by Baby Anitha, E. et al. (pp. 9) http://citeseerx.ist.psu.edu/viewdoc/download?doi=10.1.1.687.3596&rep=rep1&type=pdf.

"Location Estimation and Trajectory Prediction of Moving Lateral Vehicle Using Two Wheel Shapes Information in 2-D Lateral Vehicle Images by 3-D Computer Vision Techniques", IEEE Xplore, Sep. 14-19, 2003 by Chih-Chiun Lai et al. (p. 1) http://ieeexplore.ieee.org/xpl/articleDetails.jsp?arnumber=1241704.

"Adaptive Location Prediction Strategies Based on a Hierarchical Network Model in a Cellular Mobile Environment", The Computer Journal, May 1999 by Sajal K. Das et al. (p. 1) https://goo.gl/C27yaT.

"Automatic Transit Tracking, Mapping, and Arrival Time Prediction Using Smartphones", ACM Digital Library, Nov. 1-4, 2011 by James Biagioni et al. (pp. 14) https://www.cs.uic.edu/~jakob/papers/easytracker-sensys11.pdf.

"Location Prediction and Queries for Tracking Moving Objects", IEEE Xplore, 2000 by O. Wolfson et al. (p. 1) http://ieeexplore.ieee.org/xpl/articleDetails.jsp?arnumber=839495.

"A Novel Vehicular Location Prediction Based on Mobility Patterns for Routing in Urban VANET", EURASIP Journal on Wireless Communications and Networking, Dec. 2012 by Guangtao Xue et al. (pp. 28) http://link.springer.com/article/10.1186/1687-1499-2012-222.

"Vision-Based Vehicle Detection System With Consideration of the Detecting Location", IEEE Xplore, Apr. 3, 2012 by Minkyu Cheon et al. (p. 1) http://ieeexplore.ieee.org/xpl/articleDetails.jsp?arnumber=6175131.

"A Vehicle Vehicle Detection Approach Based on Multi-Features Fusion in the Fisheye Images", IEEE Xplore, Mar. 11-13, 2011 by Guangtao Cheng et al. (p. 1) http://ieeexplore.ieee.org/xpl/articleDetails.jsp?arnumber=5763840.

"Save Money on Fleet Fueling Purchases", Sokolis Group Fuel Managment, Jan. 26, 2011 by Sokolis (p. 1) http://www.sokolisgroup.com/blog/save-money-on-fleet-fueling-purchases/.

"Sensor-based Logistics: Monitoring Shipment Vital Signs in Real Time", Inbound Logistics, Jun. 2013 by Chris Swearingen (pp. 2) http://www.inboundlogistics.com/cms/article/sensor-based-logistics-monitoring-shipment-vital-signs-in-real-time/.

"Electronic Cargo Tracking System and Solution, Intermodal Real-time Container Tracking and Rail Car Transport Security Tracking System for End-to-End Supply Chain Security System and Tracking Solution", Cargo Tracking Solution & intermodal Transport Monitoring, Avante International Technology, Inc. in 2001-2015 (pp. 11) http://www.avantetech.com/products/shipping/.

"Sea Container Tracking Methods", Moving—Australia, 2012 (pp. 3) http://www.moving-australia.co.uk/container/tracking-methods.php.

"GlobalTag for Global Visibility and Tracking", Global Tracking Technology, in 2015 (pp. 5) http://globaltrackingtechnology.com/globaltag-for-global-visibility.html.

"The Course of the 'Connected' Car", It is Innovation, Emphasis on safety, Jan. 6, 2013 by Murray Slovick (pp. 4) http://www.ce.org/i3/Features/2013/January-February/The-Course-of-the-Connected-car.aspx.

"Cooperating Embedded Systems and Wireless Sensor Networks", John Wiley & Sons, Inc., ISBN: 978-1-84821-000-4, Mar. 10, 2008 by Michel Banâtre et al. (pp. 2) http://as.wiley.com/WileyCDA/WileyTitle/productCd-1848210000.html.

"Mitsubishi Motors Develops New Driver Support System", Mitsubishi Motors, Dec. 15, 1998 (pp. 5) http://www.mitsubishi-motors.com/en/corporate/pressrelease/corporate/detail429.html.

"Vehicle Tracking for an Evasive Manoeuvres Assistant Using Low-Cost Ultrasonic Sensors", EBSCO Host Connections, 2014, vol. 14 Issue 12, p. 22689, Dec. 2014 by Jiménez, Felipe et al. (p. 1) http://connection.ebscohost.com/c/articles/100145890/vehicle-tracking-evasive-manoeuvres-assistant-using-low-cost-ultrasonic-sensors.

"The End of Demographics: How Marketers are Going Deeper With Personal Data", Mashable Journal, in Jul. 1, 2011 by Jamie Beckland (pp. 7) http://mashable.com/2011/06/30/psychographics-marketing/.

"Power cycling 101: Optimizing energy use in advanced sensor products", Analog Dialogue, vol. 44, Aug. 2010 by Mark Looney (pp. 7) http://www.analog.com/library/analogdialogue/archives/44-08/power_cycling.html.

* cited by examiner

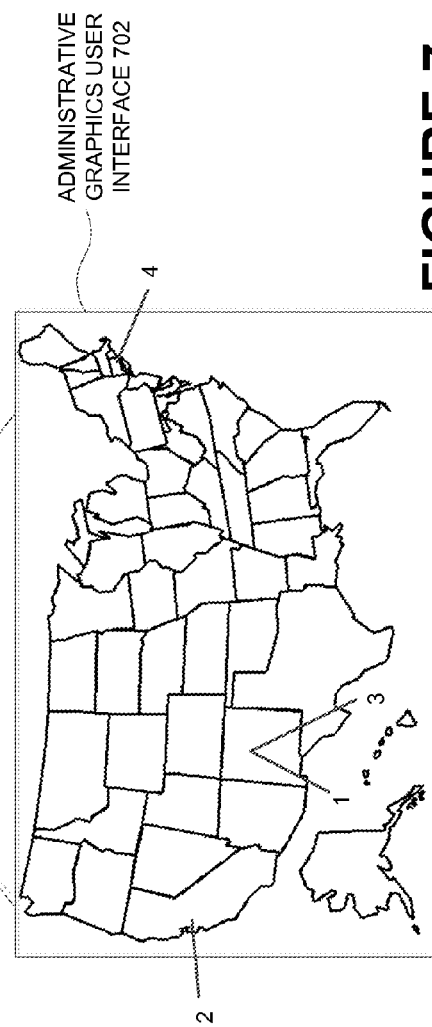
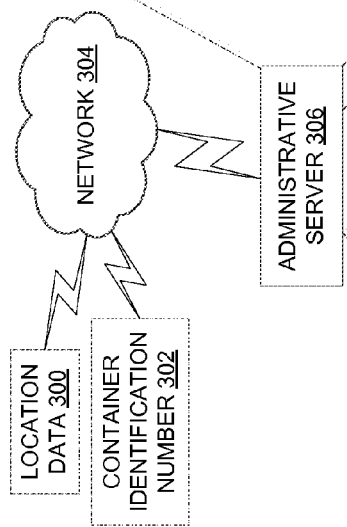
FIGURE 7

CONTAINER VERIFICATION THROUGH AN ELECTRICAL RECEPTACLE AND PLUG ASSOCIATED WITH A CONTAINER AND A TRANSPORT VEHICLE OF AN INTERMODAL FREIGHT TRANSPORT SYSTEM

CLAIM OF PRIORITY

This patent application is a Continuation-In-Part (CIP) patent application, claims priority from, and hereby incorporates by reference and claims priority from the entirety of the disclosures of the following cases and each of the cases on which they depend and further claim priority or incorporate by reference:

(1) U.S. patent application Ser. No. 13/668,698, titled SWITCH AND ACTUATOR COUPLING IN A CHASSIS OF A CONTAINER ASSOCIATED WITH AN INTERMODAL FREIGHT TRANSPORT SYSTEM filed on Nov. 5, 2012.

(2) U.S. patent application Ser. No. 13/898,493, titled CONTAINER VERIFICATION THROUGH AN ELECTRICAL RECEPTACLE AND PLUG ASSOCIATED WITH A CONTAINER AND A TRANSPORT VEHICLE OF AN INTERMODAL FREIGHT TRANSPORT SYSTEM filed on May 21, 2013, which itself is a CIP application of U.S. patent application Ser. No. 13/668,698.

FIELD OF TECHNOLOGY

This disclosure relates generally to the technical field of geospatial freight tracking, and in one example embodiment, to a method and system of container verification through an electrical receptacle and plug associated with a container and a transport vehicle of an intermodal freight transport system.

BACKGROUND

In an intermodal freight distribution business, a client may wish to track a container of a shipment of goods delivered through a land based route (e.g., by train, bus, truck). For example, the client may wish to estimate how long the shipment of containers may take to reach a destination. Furthermore, the client may wish to receive a report of an event related to a movement and/or a manipulation of the container of the shipment (e.g. loading/unloading on a freight train or tractor chassis, opening/closing of doors). Tracking devices may not work when placed on the container of the shipment because there may not be enough power during the shipment. In addition, a harsh and an inclement environment may damage any external items (e.g. tracking devices) affixed to the container.

Further, a container fixed to a chassis with wheels (e.g., semi-truck trailer) may mate with a tractor (e.g., semi-truck or articulated vehicle) in a shipping yard. A driver of the tractor may become confused in the shipping yard and may mate to the wrong trailer. The trailer may be located at a wrong terminal and may also cause the driver to mate to the wrong trailer. The trailer and goods onboard may be delivered to the wrong location. The owner of the goods may suffer monetary losses. Also, a shipping company may suffer fuel and/or time losses in addition to any fees paid due to damages. Thus, the shipping company may wish to verify that a correct trailer has been mated to a correct tractor.

Additionally, the shipping company may wish to have a verification mechanism that requires no additional work process and/or action on the part of the driver. For example, in a typical scenario, the driver may mate the trailer to the tractor via 5th wheel hitch. Also, the driver may connect an electrical system of the tractor to the trailer in order to power the trailer (e.g., trailer lights, blinkers, communication to tractor). Thus, the shipping company may wish to have verification and/or geospatial tracking occur while the driver performs no more actions than these.

SUMMARY

A method and system related to container verification through an electrical receptacle and an electrical plug associated with a container and a transport vehicle of an intermodal freight transport system is disclosed. In one aspect, a method of an intermodal transport tracking system includes coupling an electrical power plug of a container and an electrical power receptacle of a transport vehicle. Further, the method includes activating a tracking device of the container through a switch and actuator coupling of at least one of the electrical power plug and the electrical power receptacle. Furthermore, the method includes verifying an identity of the container upon coupling the electrical power plug to the electrical power receptacle through an identification tag of the container and an electronic reader.

In another aspect, a method of an intermodal transport tracking system involves activating a tracking device of at least one of a container and a transport vehicle through a switch and actuator coupling of an electrical power plug and an electrical power receptacle. The method also involves generating a location data, when the electrical power plug is coupled to electrical power receptacle, through a global positioning system (GPS) of the tracking device. Further, the method involves reading an identification tag of the container, through an electronic reader of the electrical power receptacle, to discover an identification number upon a mate event.

According to another aspect, a system includes an electrical power receptacle of a transport vehicle and an electrical power plug of a container. Also, the system includes a switch and actuator coupling to signal a mate event between the electrical power plug and the electrical power receptacle. Further, the system includes an electronic reader and an identification tag comprising a container number, wherein the container number may confirm an identity of the container. The system also includes a tracking device to provide location data associated with at least one of the container and the transport vehicle. Furthermore, the system includes an administrative server to gather location data, wherein the tracking device is communicatively coupled therewith.

The methods, system, and/or apparatuses disclosed herein may be implemented in any means for achieving various aspects, and may be executed in a form of machine readable medium embodying a set of instruction that, when executed by a machine, causes the machine to perform any of the operation disclosed herein. Other features will be apparent from the accompanying drawing and from the detailed description that follows.

BRIEF DESCRIPTION OF DRAWINGS

Example embodiments are illustrated by way of example and not limitation in the figures of the accompanying drawing, in which like references indicate similar elements and in which:

FIG. 7 depicts an administrative view of a case table listing a plurality of communication events associated with an intermodal freight transport system and a graphics user interface view illustrating a geographical origin of the events based on the communication of FIG. 3 of a location data and a container identification number to an administrative server through the network, according to one embodiment.

Other features of the present embodiments will be apparent from the accompanying drawings and from the detailed description that follows.

DETAILED DESCRIPTION

Example embodiments, as described below, may be used to provide a method, a system, and/or an apparatus of implementing container verification through an electrical receptacle and plug associated with a container and a transport vehicle of an intermodal freight transport system, according to one or more embodiments.

Figure 1:
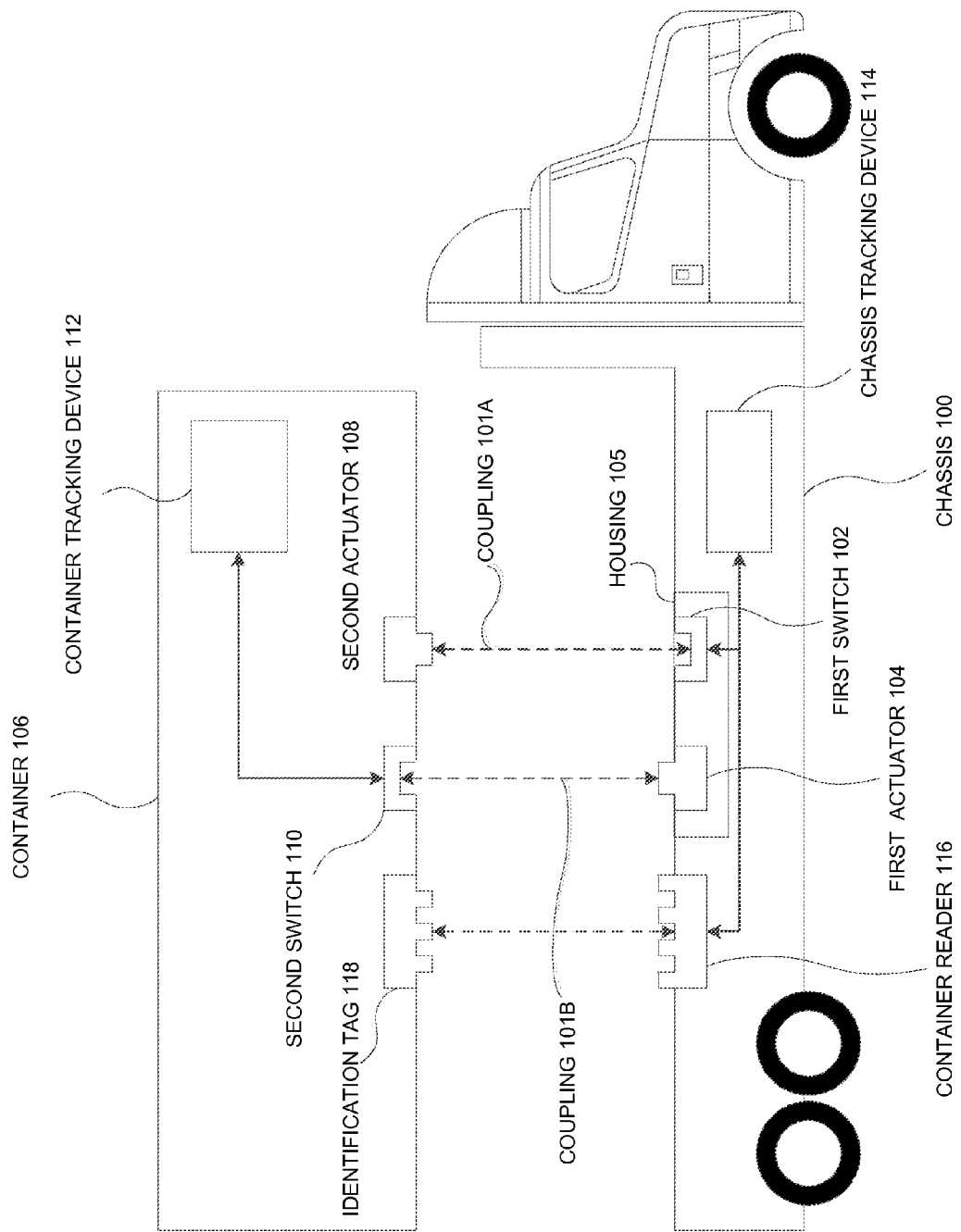
FIG. 1 is a schematic view illustrating a coupling of a container to a chassis pulled by a truck tractor, according to one embodiment.

FIG. 1 is a schematic view illustrating a coupling of a container 106 to a chassis 100 pulled by a truck tractor, according to one embodiment. Particularly, FIG. 1 depicts a coupling 101A of a first switch 102 of a housing 105 of a chassis 100 to a second actuator 108 of the container 106 when the container 106 is placed on the chassis 100. In addition, FIG. 1 depicts a coupling 101B of a second switch 110 of the container 106 to a first actuator 104 of a housing 105 of the chassis 100 when the container 106 is placed on the chassis 100. The chassis 100 may provide a capability to mount a container 106. The container 106 may be a standard, reusable steel box used to safely, efficiently, and/or securely transport a shipment of goods distributed through an intermodal freight transport system. The chassis 100 may be a secure container docking trailer associated with an intermodal transport vehicle (e.g., a railcar, a truck) as part of an intermodal freight transport system.

A switch (e.g. a first switch 102, a second switch 110) may be an electrical component that, when trigged by an actuator (e.g. a first actuator 104, a second actuator 108), may complete or interrupt an electrical circuit. The switch may be a magnetic switch or a pressure switch. The actuator may be a magnet in the case of a magnetic switch or an application of pressure by the container 106 in the case of a pressure switch. The switch may be designed to activate (e.g. through a wake event 200 of FIG. 2) a number of electrical devices (e.g., the container tracking device 112, the chassis tracking device 114, the container reader 116 of FIG. 1) associated with the circuit when the switch is coupled to an appropriate actuator.

Figure 2:
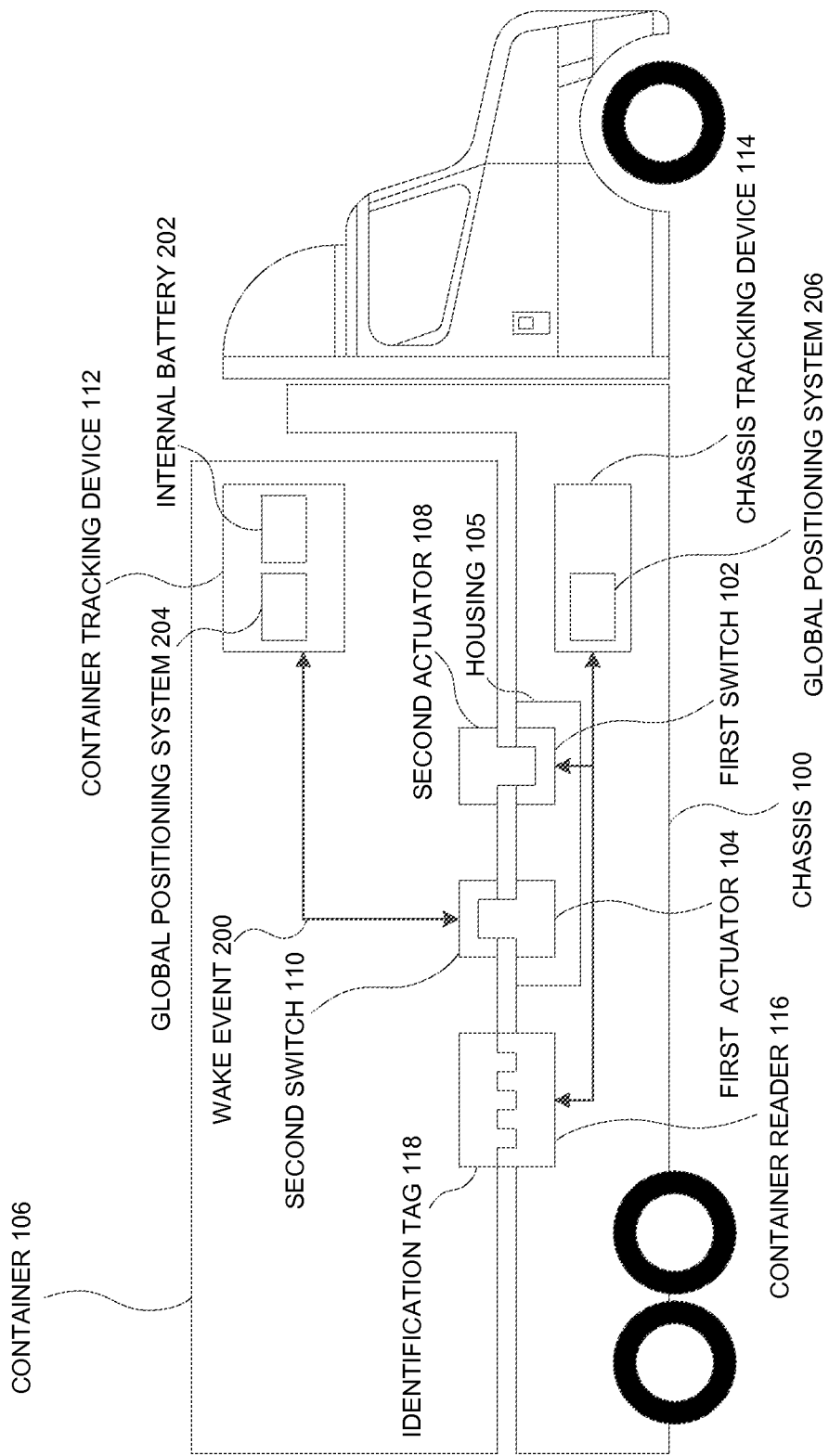
FIG. 2 is a schematic view illustrating an activation of a container reader of a chassis, a container tracking device and a chassis tracking device based on the coupling, of FIG. 1, of the container to the chassis, according to one embodiment.

FIG. 2 is a schematic view illustrating an activation of a container reader 116 of a chassis 100, a container tracking device 112, and/or a chassis tracking device 114 based on the coupling, of FIG. 1, of the container 106 to the chassis 100, according to one embodiment. Particularly, FIG. 2 illustrates signaling a wake event 200 to a container tracking device 112 when the first switch 102 and the first actuator 104 of the chassis 100 is coupled with the second actuator 108 and the second switch 110 of the container 106. The container tracking device 112 may be a self-powered telemetry device designed to power on based on the signaling of the wake event 200 in FIG. 2. The container tracking device 112 may include an internal battery 202 and a GPS 204.

FIG. 2 illustrates powering the container tracking device 112 through an internal battery 202 of the container tracking device 112 based on the wake event 200. Furthermore, FIG. 2 also depicts activating a chassis tracking device 114 and a container reader 116 of the chassis when the first switch 102 of the chassis 100 is coupled with the second actuator 108 of the container 106. The chassis tracking device 114 and the container reader 116 may receive power (e.g., 7-way power) from a transport vehicle associated with the chassis 100. The chassis tracking device 114 may also include a GPS 206. A global positioning system (e.g., the GPS 204, the GPS 206) may be an integrated space-based satellite system that provides location and time information of at least one of the container 106 and the chassis 100 to an administrative server 306 to be displayed through an administrative graphics user interface 702, as shown in FIG. 7.

A container reader 116 may be a radio frequency identification scanner or an optical scanner designed to gather data from a tag (e.g., the identification tag 118 of FIG. 1) attached to an object. The container reader 116 may receive power (e.g., 7-way power) from a transport vehicle associated with the chassis 100. The container reader 116 may be activated by the coupling 101A of the second actuator 108 of the container 106 to the first switch 102 of the chassis 100. The container reader 116 may be configured to read an identification tag 118 of the container 106 to discover a container identification number 302 based on the coupling 101A of the second actuator 108 of the container 106 to the first switch 102 of the chassis 100.

It should be noted that the chassis 100 may include an electrical power plug and/or an electrical receptacle, according to common industry practice. Further, it should be noted that the container 106 may be considered a trailer 1102, according to another embodiment and industry practice. For example, an intermodal shipping container may be a semi-truck trailer.

Figure 11:
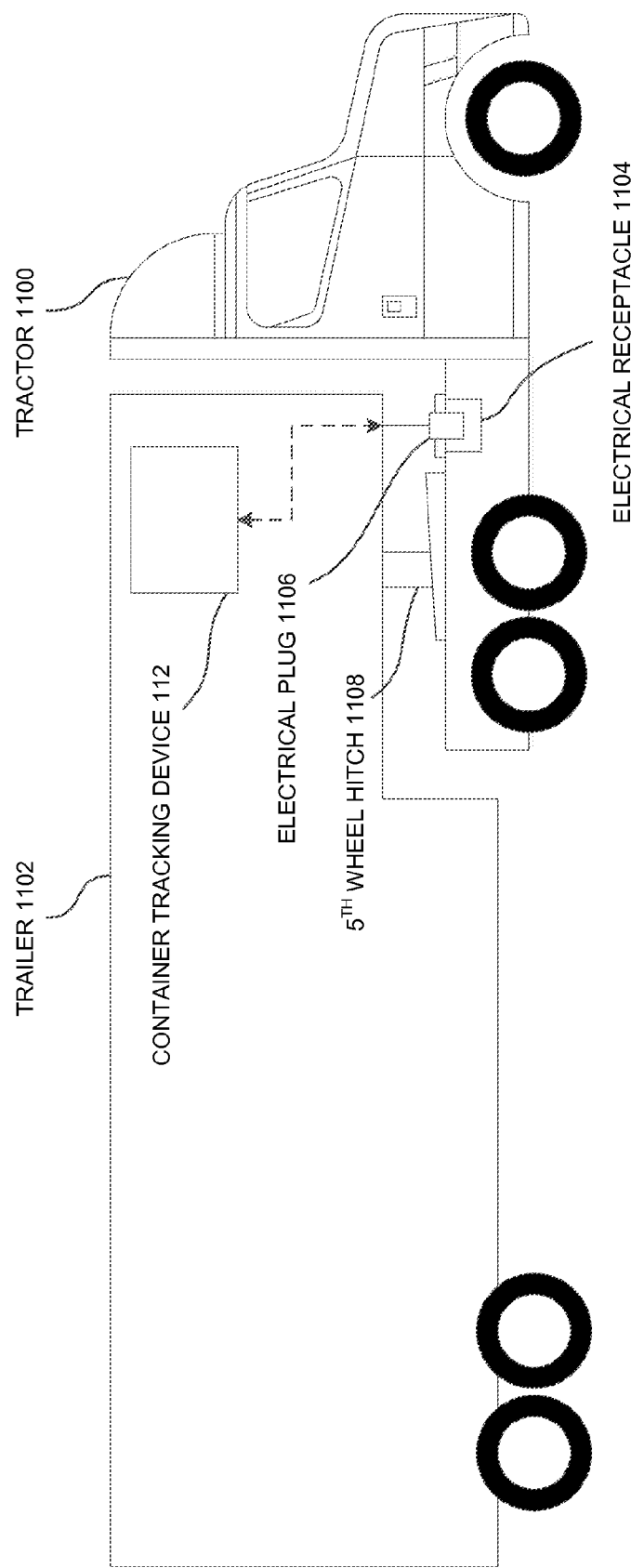
FIG. 11 depicts a tractor and a trailer mated through a 5th wheel hitch and through an electrical receptacle and an electrical plug, according to one embodiment.

According to an embodiment of FIG. 11, the tractor 1100 includes an electrical receptacle 1104 to couple an electrical system of the tractor 1100 and the trailer 1102. Further, the container 106 may include an electrical plug 1106 and/or an electrical receptacle 1104 to provide coupling of an electrical system thereof to a transport vehicle, in one or more embodiments. Furthermore, an existing electrical plug and/or electrical receptacle of the tractor 1100, the trailer 1102, and/or the container 106 may provide an optimal location to place the switch and actuator coupling 101B, as well as the identification tag 118 and container reader 116, according to one embodiment.

Figure 3:
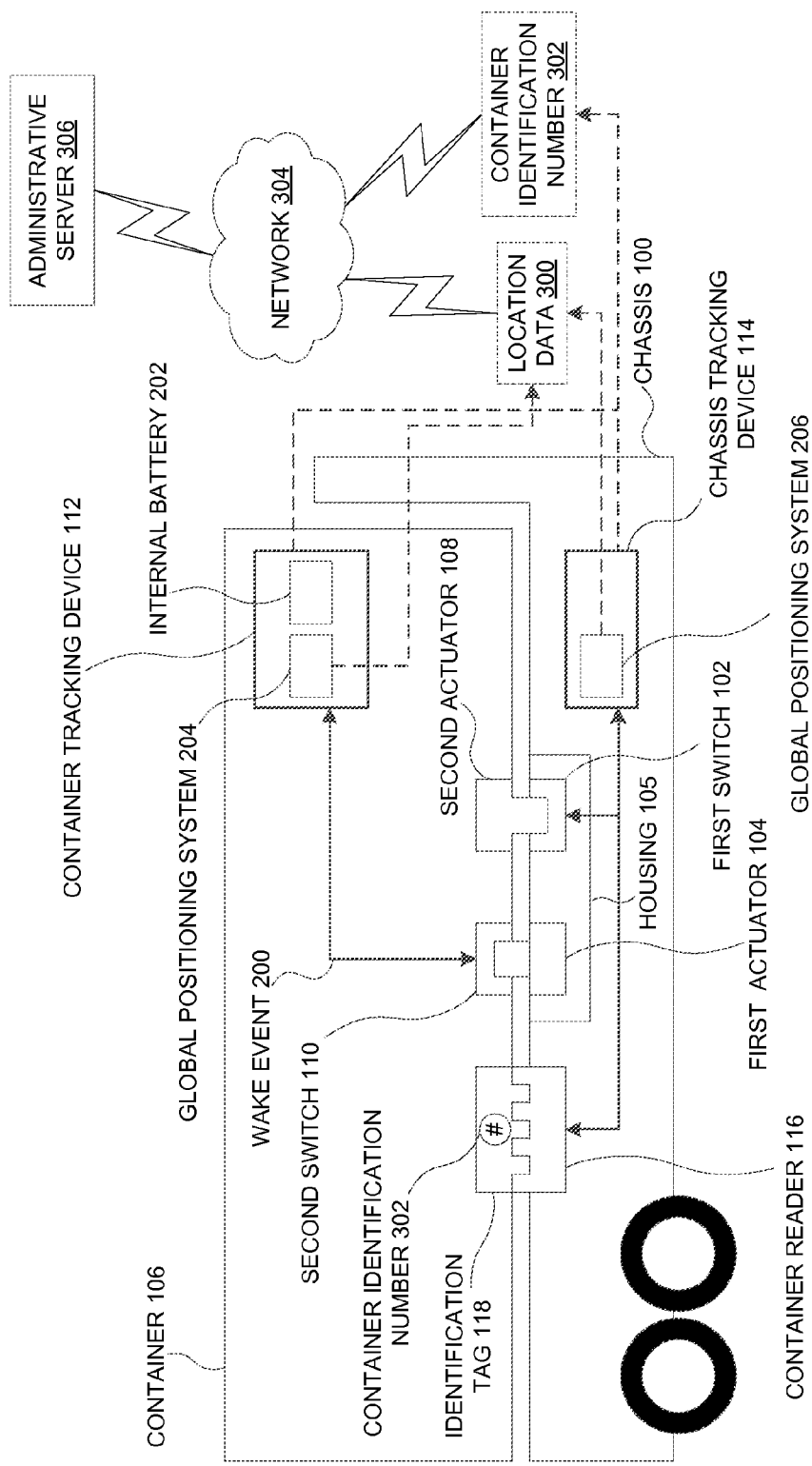
FIG. 3 is schematic view illustrating a communication of a location data and a container identification number to an administrative server through a network by at least one of the container tracking device and the chassis tracking device of FIG. 2, according to one embodiment.

FIG. 3 is schematic view illustrating a communication of a location data 300 and a container identification number 302 to an administrative server 306 through a network 304 by at least one of a container tracking device 112 and a chassis tracking device 114 of FIG. 2, according to one embodiment. Specifically, FIG. 3 illustrates generating, through a GPS 204 or a GPS 206 of at least one of the container tracking device 112 and the chassis tracking device 114, a location data 300 when the first switch 102 and the first actuator 104 of the chassis 100 is coupled with the second actuator 108 and the second switch 110 of the container 106. In addition, FIG. 3 also illustrates reading an identification tag 118 of the container 106 through a container reader 116 of the chassis 100 to discover a container identification number 302 when the first switch 102 and the first actuator 104 of the chassis 100 is coupled with the second actuator 108 and the second switch 110 of the container 106. Furthermore, FIG. 3 also illustrates communicating the location data 300 and the container identification number 302 through at least one of the container tracking device 112 and the chassis tracking device 114, through a network 304, to an administrative server 306.

The network 304 (e.g., WAN, mobile, telecommunications, internet, intranet, and/or ZigBee network) may enable communication between the container tracking device and the administrative server 306 and between the chassis tracking device 114 and the administrative server 306. The administrative server 306 may be a remote processing and storage device associated with an intermodal freight transport system. The administrative server 306 may aggregate the location data 300 and the container identification number 302 of a multiplicity of containers in a case table 700 and may geographically display the location of the multiplicity of containers through an administrative graphics user interface 702 of the administrative server 306, as shown in FIG. 7.

Referring to FIG. 7, depicted is an administrative view of a case table 700 listing a plurality of communication events associated with an intermodal freight transport system and an administrative graphics user interface view 702 illustrating a geographical origin of the events based on the communication, of FIG. 3, of a location data 300 and a container identification number 302 to an administrative server 306 through the network 304, according to one embodiment. The case table 700 may designate an event number 704, a container number 706, a location 708, and/or an event type 710. The event number 704 may indicate a chronological order of the events. The container number 706 may be based on a container identification number 302 discovered through a container reader 116 reading an identification tag 118 of a container 106. The location 708 may be based on a location data 300 generated by a GPS 204 of the container tracking device 112 and/or a GPS 206 of the chassis tracking device 114 when a first switch 102 and a first actuator 104 of the chassis 100 are coupled with the second actuator 108 and the second switch 110 of the container 106. The event type 710 may be based on any of a plurality of events associated with the chassis 100 (e.g., an initial movement 402, a duration 406 of continuous movement 404, a duration 410 of a stationary condition 408 of FIG. 4) and/or the container 106 (e.g., an opening 500 of a door 504 of the container 106, a closing 502 of the door 504 of the container of FIG. 5).

Figure 4:
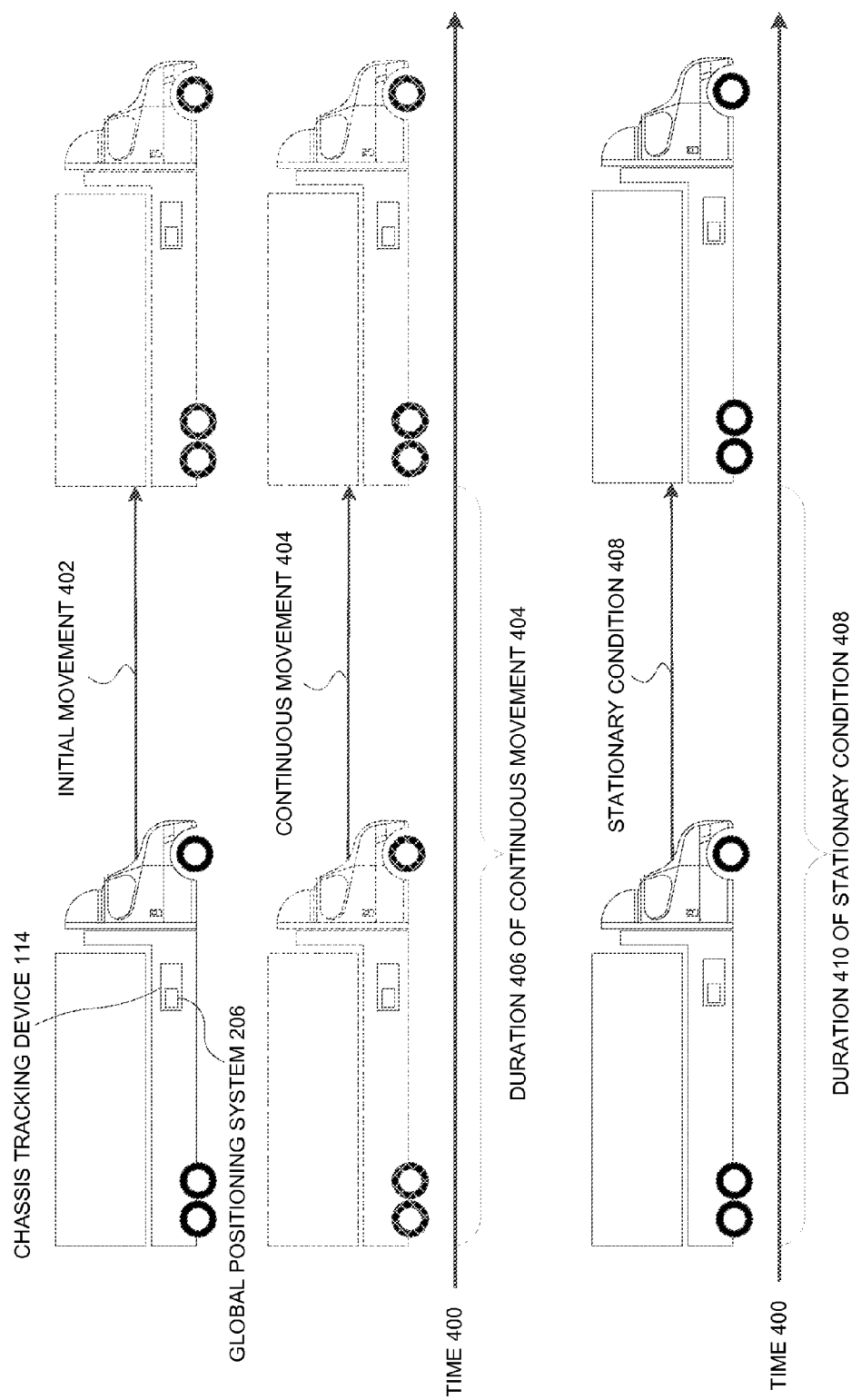
FIG. 4 is a time lapse diagram depicting a detection of an initial movement of the chassis of FIG. 1 and a calculation of a duration of continuous movement of the chassis and a duration of a stationary condition of the chassis, according to one embodiment.

FIG. 4 is a time lapse diagram depicting a detection of an initial movement 402 of the chassis 100 of FIG. 1 and a calculation of a duration 406 of continuous movement 404 of the chassis and a duration 410 of a stationary condition 408 of the chassis 100 with respect to time 400, according to one embodiment. Particularly, FIG. 4 involves detecting an initial movement 402 of the chassis 100 through the GPS 206 of the chassis tracking device 114, determining a duration 406 of a continuous movement 404 of the chassis 100 through the GPS 206 of the chassis tracking device 114, and/or calculating a duration 410 of a stationary condition 408 of the chassis 100 through the GPS 206 of the chassis tracking device 114.

Figure 6:
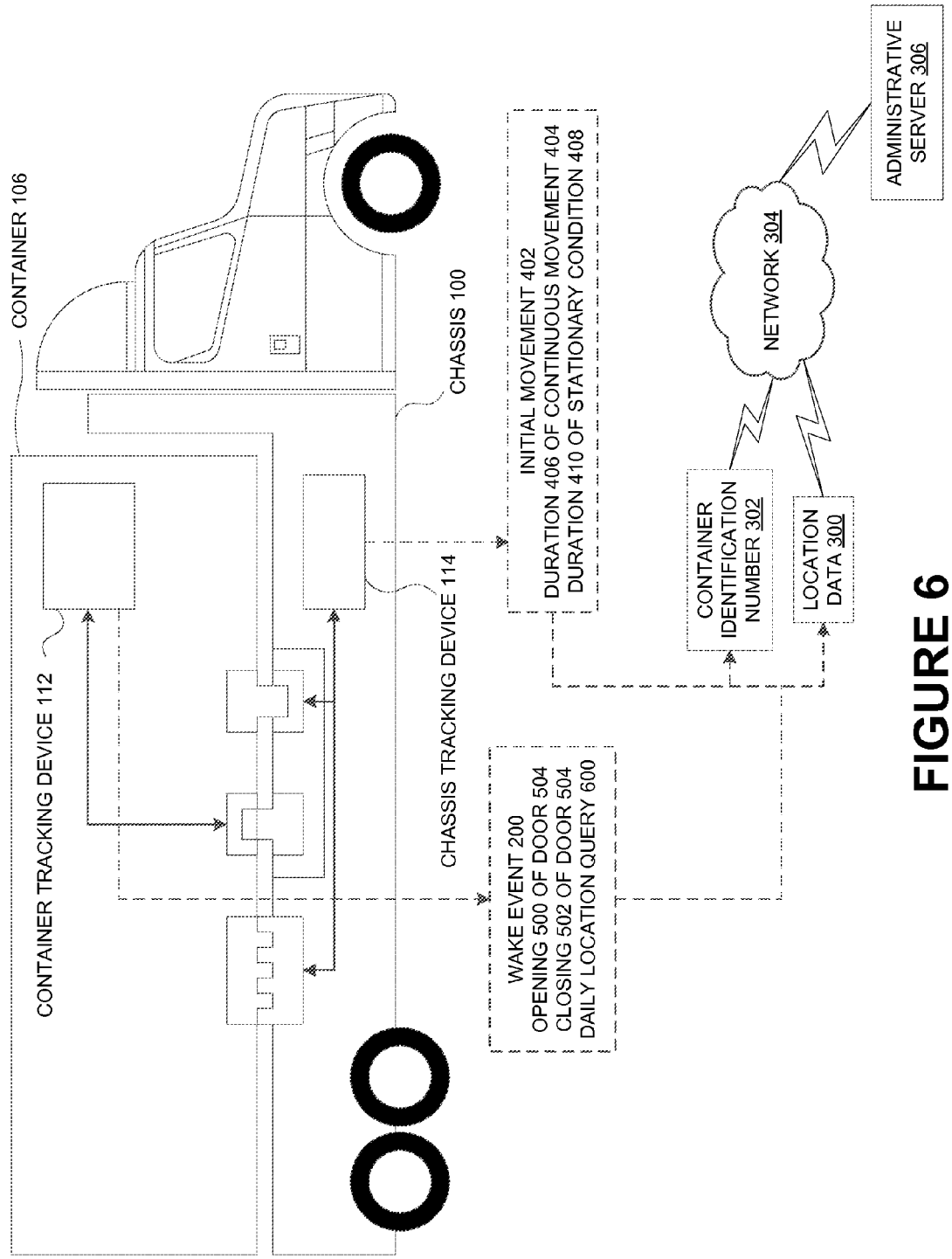
FIG. 6 illustrates a communication of a container tracking device and a chassis tracking device of FIG. 1 to an administrative server of FIG. 3 through a network based on a set of events triggering the communication, according to one embodiment.

According to one embodiment, an initial movement 402, a duration 406 of a continuous movement 404, and/or a duration 410 of a stationary condition 408 may trigger a communication, through the chassis tracking device 114 of the chassis 100, of a location data 300 generated by a GPS 206 of the chassis tracking device 114 and a container identification number 302 detected through a container reader 116 of the chassis 100, to an administrative server 306 through a network 304, as shown in FIG. 6.

The initial movement 402 may be any movement after a duration of rest. The initial movement 402 may journey indicate an onset of a delivery route of the chassis 100 for the purpose of tracking the container 106 coupled to the chassis 100. The determined duration 406 of a continuous movement 404 may indicate a continuation of the delivery route of the chassis 100 for the purpose of tracking the container 106 coupled to the chassis 100. The calculated duration 410 of a stationary condition 408 may indicate an end of the route of the chassis 100 for the purpose of tracking the container 106 coupled to the chassis 100. The GPS 206 of the chassis tracking device 114 may register a movement of the chassis 100 by detecting a change in the position of the chassis 100.

Figure 5:
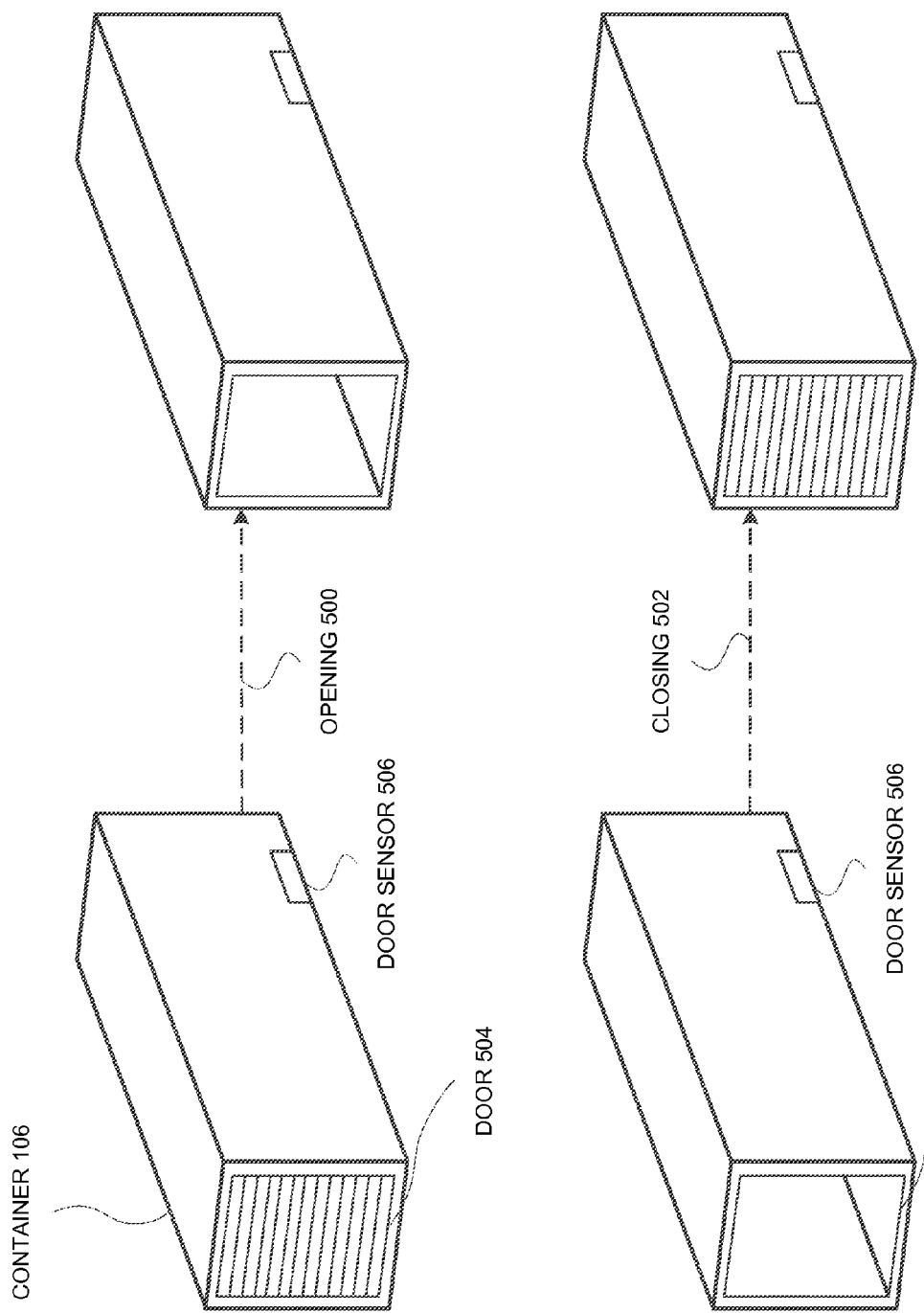
FIG. 5 portrays an opening and a closing of a door of a container as detected through a door sensor of the container of FIG. 1, according to one embodiment.

FIG. 5 portrays an opening 500 and a closing 502 of a door 504 of a container 106 as detected through a door sensor 506 of the container 106 of FIG. 1, according to one embodiment. An opening 500 and a closing 502 of a door 504 of a container 106 may be an event of interest to a client of an intermodal freight transport business.

According to one embodiment, an opening 500 and a closing 502 of a door 504 of a container 106 may trigger a communication, through the container tracking device 112 of the container 106, of a location data 300 of the container 106 generated by a GPS 204 of the container tracking device 112, to an administrative server 306 using a network 304, as shown in FIG. 6.

According to another embodiment, an opening 500 and a closing 502 of a door 504 of a container 106 may trigger a communication, through the container tracking device 112 of the container 106, of a location data 300 of the container 106 generated by a GPS 204 of the container tracking device 112 and a container identification number 302 discovered through a container reader 116 of the chassis 100, to an administrative server 306 using a network 304, as shown in FIG. 6.

FIG. 6 illustrates a communication of a container tracking device 112 and a chassis tracking device 114 to an administrative server 306 through a network 304 based on a set of events triggering the communication, according to one embodiment. The container tracking device 112 and the chassis tracking device 114 may communicate with an administrative server 306 based on a set of events triggering the communication. The container tracking device 112 may communicate, through a network 304, the location data 300 to an administrative server 306 based on at least one of a wake event 200, an opening 500 of a door 504 of the container 106, a closing 502 of the door 504 of the container 106, and/or a daily location query 600. The chassis tracking device 114 may communicate, through a network 304, the location data 300 and a container identification number 302 of the container 106 to an administrative server 306 based on a detection of an initial movement 402 of the chassis 100, a duration 406 of continuous movement 404 (e.g., every 10 minutes of continuous movement 404), a duration 410 of a stationary condition 408 (e.g., after 6 minutes of a stationary condition 408).

Figure 8:
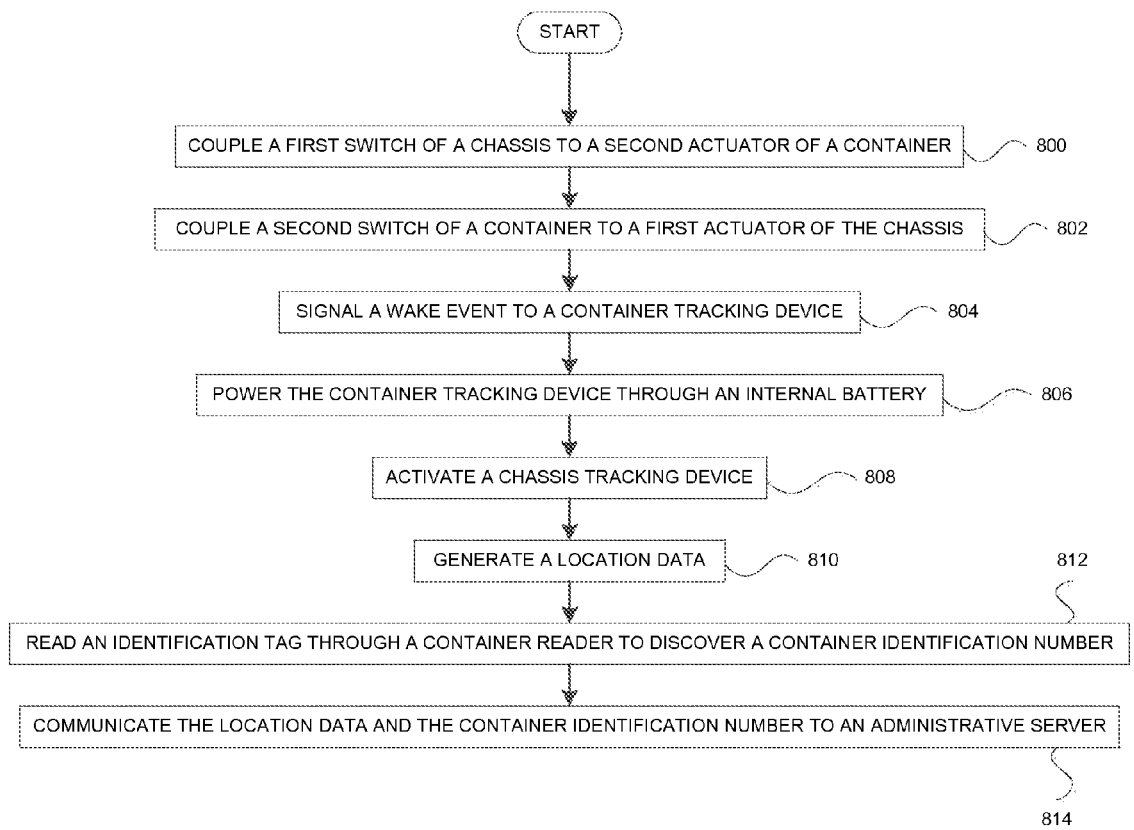
FIG. 8 is a process flow chart outlining the coupling, of FIG. 1, of a container and a chassis and a subsequent communication of a location data and a container identification number to an administrative server through at least one of a container tracking device and a chassis tracking device, according to one embodiment.

FIG. 8 is a process flow chart outlining the coupling of FIG. 1, of a container 106 and a chassis 100 of and a subsequent communication of a location data 300 and a container identification number 302 to an administrative server 306 through at least one of a container tracking device 112 and a chassis tracking device 114, according to one embodiment. In operation 800, a first switch 102 of a chassis 100 is coupled to a second actuator 108 of a container 106. In operation 802, a second switch 110 of the container 106 is coupled to a first actuator 104 of the chassis 100. In operation 804, a wake event 200 is signaled to a container tracking device 112. In operation 806, the container tracking device 112 is powered through an internal battery 202. In operation 808, a chassis tracking device 114 is activated. In operation 810, a location data 300 is generated. In operation 812, an identification tag 118 is read through a container reader 116 to discover a container identification number 302. In operation 814, the location data 300 and the container identification number 302 are communicated to an administrative server 306.

Figure 9:
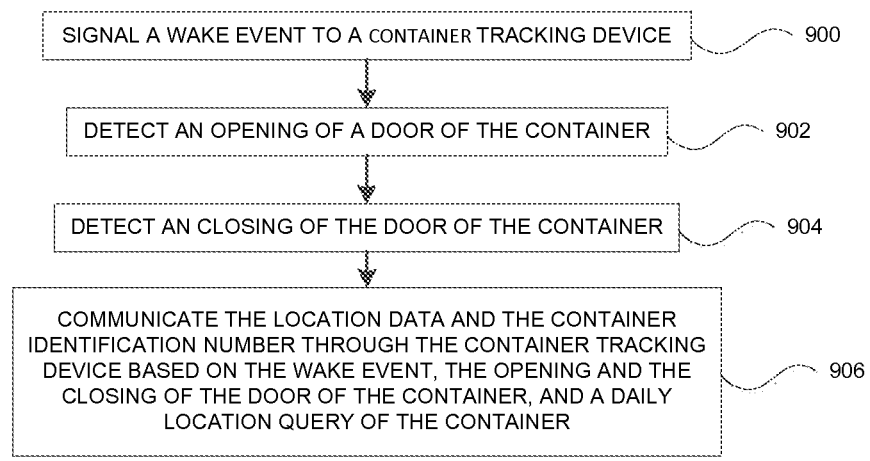
FIG. 9 is a process flow chart describing a set of events triggering the communication of FIG. 3 of a location data and a container identification number to an administrative server through a container tracking device, according to one embodiment.

FIG. 9 is a process flow chart describing a set of events triggering the communication of FIG. 3 of a location data 300 and a container identification number 302 to an administrative server 306 through a container tracking device 112, according to one embodiment. In operation 900, a wake event 200 is signaled to a container tracking device 112. In operation 902, an opening 500 of a door 504 of the container 106 is detected. In operation 904, a closing 502 of the door 504 of the container 106 is detected. In operation 906, a location data 300 and a container identification number 302 is communicated through the container tracking device 112 based on the wake event 200, the opening 500 and the closing 502 of the door 504 of the container 106, and/or a daily location query 600 of the container 106.

Figure 10:
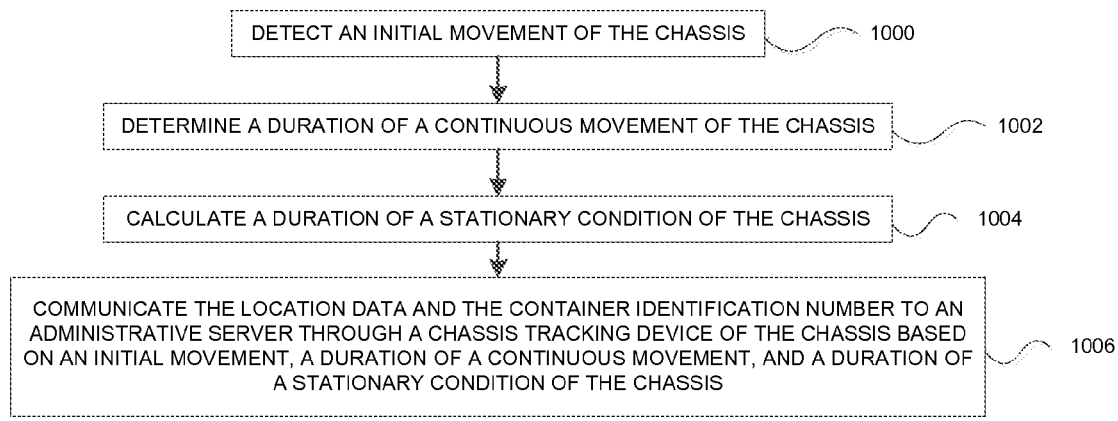
FIG. 10 is a process flow chart describing a set of events triggering a communication of a location data and a container identification number to an administrative server through a chassis tracking device, according to one embodiment.

FIG. 10 is a process flow chart describing a set of events triggering a communication of a location data 300 and a container identification number 302 to an administrative server 306 through a chassis tracking device 114, according to one embodiment. In operation 1000, an initial movement 402 of the chassis 100 is detected. In operation 1002, a duration 406 of a continuous movement 404 of the chassis 100 is determined. In operation 1004, a duration 410 of a stationary condition 408 of the chassis 100 is calculated. In operation 1006, a location data 300 and a container identification number 302 is communicated to an administrative server 306 through a chassis tracking device 114 based on an initial movement 402, a duration 406 of a continuous movement 404, and/or a duration 410 of a stationary condition 408 of the chassis 100.

FIG. 11 depicts a tractor 1100 and a trailer 1102 as an alternative embodiment comprising the switch and actuator coupling. The tractor 1100 may be a vehicle that may be commonly used in a ground-based freight transportation industry (e.g., semi-truck, articulated vehicle, 5th wheel equipped vehicle, vehicle with a tractor puller engine/transmission, pick-up truck). Also, the trailer 1102 may comprise a container 106 that may be fixed to a transportation chassis including wheels and a $5^{th}$ wheel hitch 1108 (e.g., semi-truck trailer, freight transportation trailer, container and trailer chassis, etc.), according to another embodiment. The trailer 1102 may be used to provide ground transportation of freight with the tractor 1100. Each of the previously disclosed components (e.g., first actuator 104, second actuator 108, coupling 101, container reader 116, identification tag 118) may be alternatively located between the tractor 1100 and the trailer 1102. The significance of having these components between the aforementioned elements may be that the switch and actuator coupling 101B and the identification tag 118 and container reader 116 may be easily mated by a vehicle driver through an existing electrical adapter of the semi-truck and trailer, according to one embodiment. The functionality of the various components may be the same as previously disclosed embodiments, although with respect to a mating event between the tractor 1100 with the trailer 1102.

According to one embodiment, the tractor 1100 may mate with the trailer 1102 via $5^{th}$ wheel hitch 1108 and/or an electrical harness. The electrical harness may mate the electrical system of the tractor 1100 and/or a battery therein with the electrical system trailer 1102 in order to provide electrical power to running lights, brake lights, blinkers, warning lights, and tractor-trailer communications, in one or more embodiments.

FIG. 11 depicts the electrical harness comprising an electrical receptacle 1104 of the tractor 1100 and an electrical plug 1106 of the trailer 1102. The electrical receptacle 1104 and electrical plug 1106 may be a 7-way adapter, 4-way adapter, hardwiring with a disconnect, generic electrical harness, and/or a custom harness. Further, the electrical receptacle 1104 and electrical plug 1106 comprise to include the switch and actuator coupling, in one or more embodiments.

In one or more embodiments, various connectors may be used for the electrical receptacle 1104, such as ones including four to seven pins which may permit a transfer of power for lighting as well as auxiliary functions such as an electric trailer brake controller, backup lights, and/or a 12V power supply for a winch, interior trailer lights, and/or a trailer power outlet, according to some embodiments. Further, the electrical receptacle 1104 may be used as a connector under the external vehicle chassis and/or embedded on the external surface, according to one embodiment. The electrical receptacle 1104 may also be placed with a mounting bracket to attach it to the vehicle chassis, according to one embodiment. This may help prevent damage that may occur if the electrical receptacle is left dangling, according to one embodiment. Furthermore, an adapter may be used to fit an existing plug and/or receptacle of a vehicle with the switch and actuator coupling and/or the identification tag 118 and container reader 116.

Further, nearly all tractors and/or trailers in common industry production and usage have electrical receptacles 1104 and/or electrical plugs 1106 with which to couple the electrical systems of the tractor and trailer. An existing receptacle/plug may provide a surface area to place the switch and actuator coupling as well as the container reader and identification tag, according to one embodiment. Furthermore, an existing adapter may be easily removed and/or replaced with a modified electrical adapter comprising the switch and actuator coupling 101 as well as the container reader 116 and identification tag 118, according to another embodiment.

Figure 12:
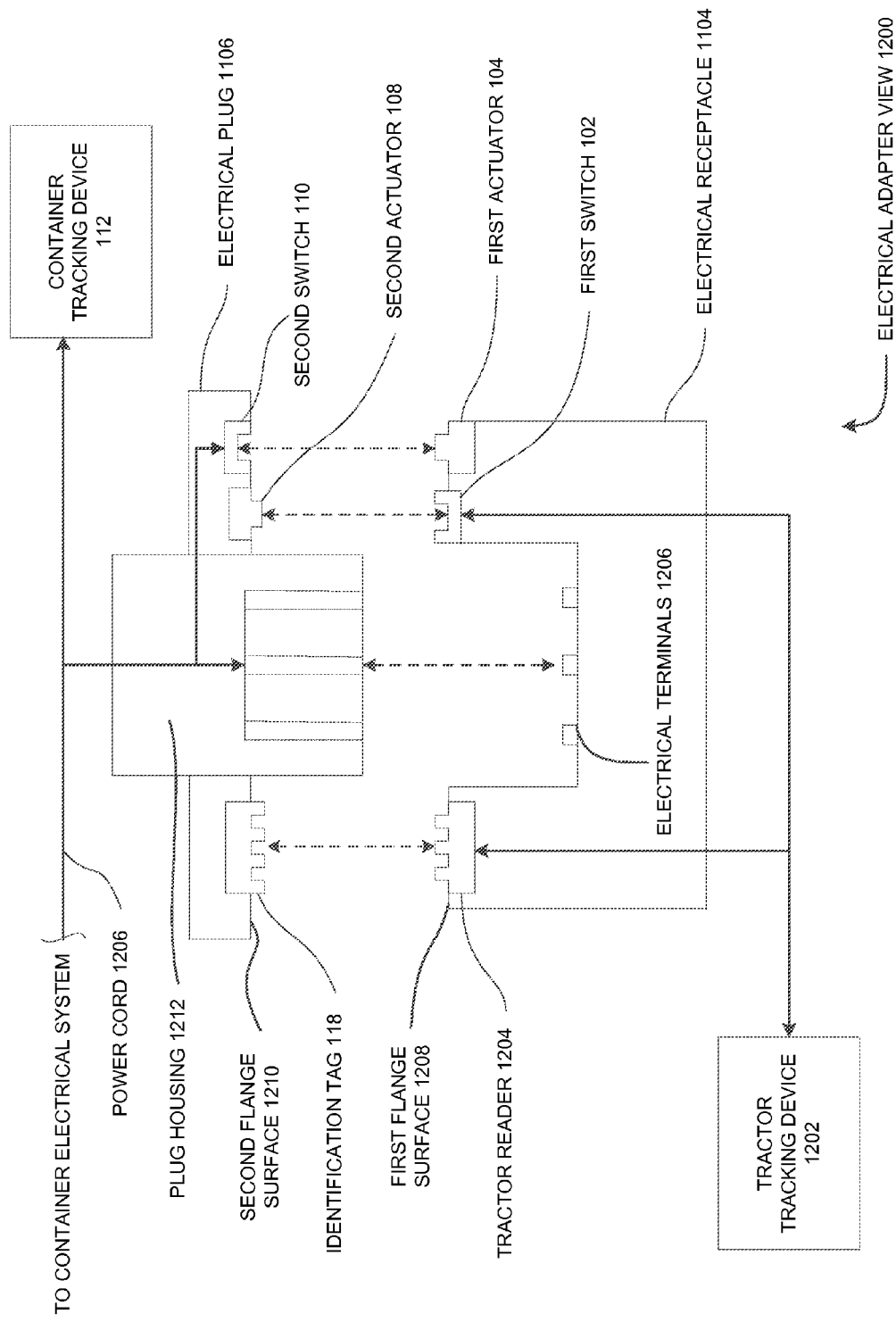
FIG. 12 depicts an electrical receptacle and electrical plug with the switch and actuator coupling, container reader, and identification tag of FIG. 1, according to one embodiment.

FIG. 12 depicts the electrical receptacle 1104 and electrical plug 1106 in an electrical adapter view 1200, according to one embodiment. The electrical receptacle 1104 comprises electrical terminals 1206 to transmit electrical power to the electrical system of the trailer 1102 and/or the container 106. The electrical receptacle 1104 may include a first flange surface 1208 and/or a housing that may contact the electrical plug 1106 during a mate event (e.g., coupling of the electrical plug 1106 and the electrical receptacle 1104). The first flange surface 1208 and/or receptacle housing may include the first switch 102 and the first actuator 104 of FIG. 1. Also, the electrical receptacle 1104 may include the container reader 116. Each component may function according to previous disclosure regarding the mate event. Further, the electrical plug 1106 may include a second housing to protect the internal wiring.

According to one embodiment, the plug housing 1212 may include a second flange surface 1210. The second flange surface 1210 and/or the plug housing 1212 surface may provide a surface area to place a plurality of components. FIG. 12 shows that the second flange surface 1210 of the electrical plug 1106 may contact the first flange surface 1208 of the electrical receptacle 1104 during a mate event. The second switch 110 and second actuator 108 as well as the identification tag 118 may be included on the second flange surface 1210 and/or plug housing 1212 of the electrical plug 1106, according to one embodiment.

During a mate event, the first switch 102 and first actuator 104 may mate with the second actuator 108 and the second switch 110, according to one embodiment. The second switch 110 may signal wake event 200 to the container tracking device 112. Therefore, the container tracking device 112 may perform all of the previously disclosed functions but may be located within the trailer 1102, according to one embodiment. The first switch 102 may signal a wake event 200 to the tractor tracking device 1202, according to another embodiment.

In one embodiment, the tractor tracking device 1202 may be of a similar and/or same functionality of the abovementioned chassis tracking device 114. It may include the GPS 206 and may further communicate the location data 300 and the container identification number 302 by the network 304 to the administration server 306. According one embodiment, the tractor tracking device 1202 may be located within the tractor 1100 and/or within the cockpit of the tractor 1100.

In another embodiment, the container reader 116 may be located on the first flange area 1208 and/or housing of the electrical receptacle 1104. The container reader 116 may read the identification tag 118 of the trailer 1102 when the electrical plug 1106 mates with the electrical receptacle 1104. The container reader 116 may function according to the previously disclosed embodiments. The wake event 200 and a subsequent reading of the container identification number 302 may occur at the mating of the electrical plug 1106 of the trailer 1102 to the electrical receptacle 1104 of the tractor 1100. The container reader 116 and identification tag 118 may include any of the following technologies but is not limited to: Near-Field Communications (NFC), Radio Frequency Identification (RFID), barcode and scanner, optical sensor, smart card.

In an exemplary embodiment, the container reader 116 may identify an identification number through reading the identification tag 118, wherein the identification number is unknown and/or is of an incorrect container and/or trailer. For example, the tractor 1100 may mate with the wrong trailer 1102 at a loading dock. Thus, the container reader 116 may identify a wrong identification number and may trigger an alert. The container reader 116 may alert a driver of the tractor 1100 through the tractor tracking device 1202, wherein the tractor tracking device 1202 is located in the cockpit of the tractor 1100 and/or comprises a graphical user interface, in one or more embodiments. Further, the container tracking device 112 and/or the tractor tracking device 1202 may communicate that a wrong mate event has occurred to the administrative server 306 based on an unknown and/or incorrect identification tag 118 read through the container reader 116, according to another embodiment. Furthermore, in another embodiment, wherein the administrative server 306 is notified of the wrong mate event, the driver of the tractor 1100 may receive a message (e.g., Short Message Service (SMS) text message, voice message, phone call, pager alert) to notify of the wrong mate event.

Figure 13:
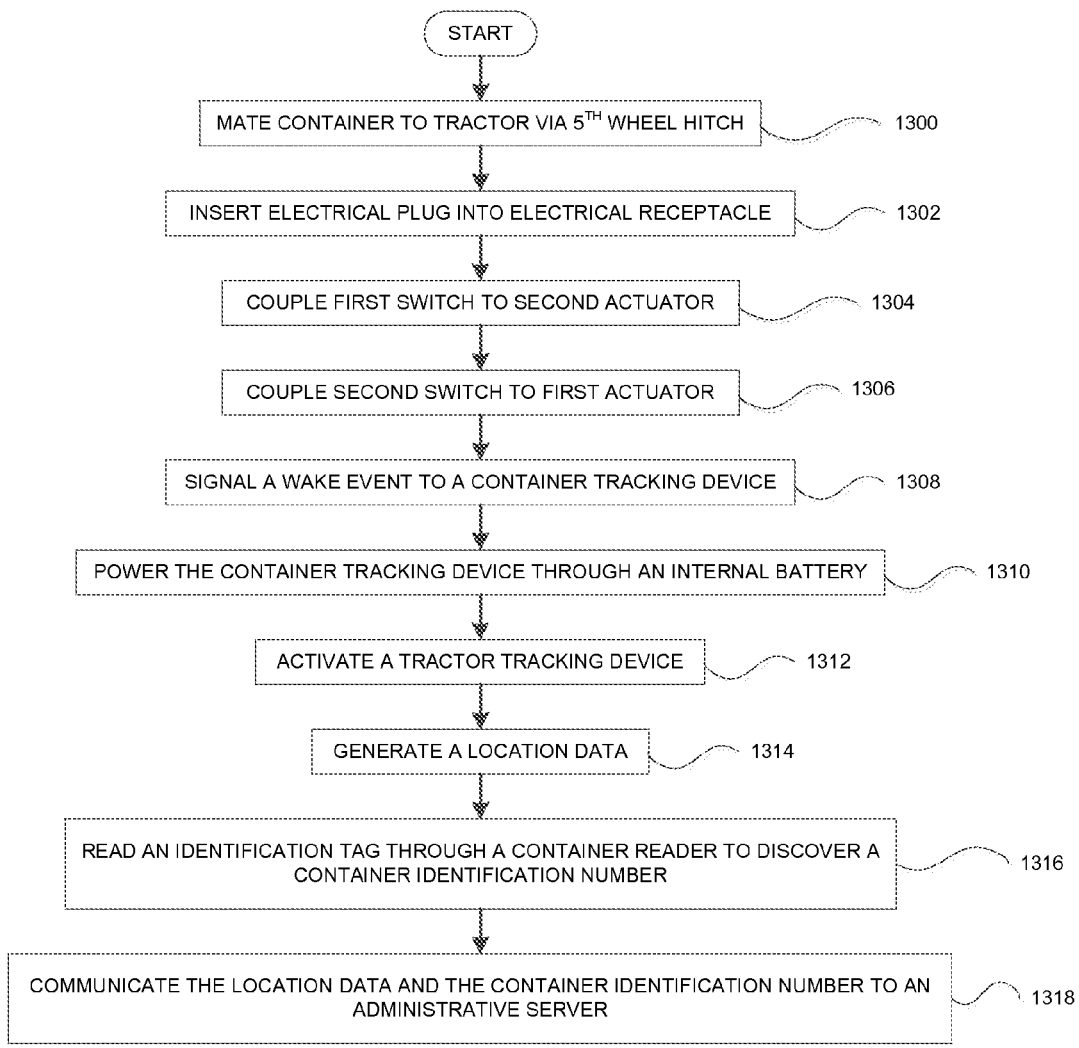
FIG. 13 is a process flow chart outlining a mating event between the tractor and trailer of FIG. 11, including a mating event between an electrical system of the tractor and trailer, according to one embodiment.

FIG. 13 is a process flow chart outlining the coupling of the electrical plug 1106 and the electrical receptacle 1104 of FIG. 11, according to one embodiment. Further, FIG. 13 outlines a subsequent communication of the location data 300 and the container identification number 302 to the administrative server 306 through at least one of the container tracking device 112 and the tractor tracking device 1202, according to one embodiment. In operation 1300, the trailer 1102 may be mated to the tractor 1100 through the 5$^{th}$ wheel hitch 1108 and the electrical harness. In operation 1302, the electrical plug 1106 may be inserted into the electrical receptacle 1104. In operation 1304, the first switch 102 may be coupled to the second actuator 108. In operation 1306, the second switch 110 may be coupled to the first actuator 104. In operation 1308, the wake event 200 may be signaled to the container tracking device 112. In operation 1310, the container tracking device 112 may receive electrical power from an internal battery 202. In operation 1312, the tractor tracking device 1202 may be activated by the first switch 102. In operation 1314, the tractor tracking device 1202 may generate a location data 300. In operation 1316, the identification tag 118 may be read through the container reader 116 of the tractor 1100 in order to discover a container identification number 302. In operation 1318, the location data 300 and the container identification number 302 may be communicated to the administration server 306.

An example will now be described in which the various embodiments will be explained in a hypothetical scenario. A distribution business named 'XYZ Distributors' may wish to track containers carrying shipments of goods to their respective destinations. Also, XYZ Distributor may have more containers than the numbers of tractors able to pull them. As such, XYZ Distributors may wish to separately track containers as well as chassis units. Additionally, a client of XYZ Distributors, named 'Brian', may wish to receive regular updates of the location of his shipment(s). In order to facilitate these regular updates, XYZ Distributors may wish to deploy tracking devices to track the container and the chassis, separated or not.

The tracking device of the container may trigger automatically daily, when the door of the container opens or closes, and/or when the container mounts to a chassis. The tracking device of the tractor may trigger based on a detection of movement. For example, the tractor may be tracked when the tractor starts to move, when it continues to move for a specific duration, and/or when it stops moving for a specific duration. Further, connecting a 7-way power plug of the container to the tractor may activate a container reader of the tractor and/or the tracking device. The container reader may read a tag on the container to identify a unique number associated with the container. The tracking devices may utilize a global positioning system to track the locations of the container and the tractor.

The tracking devices may transmit location data and/or container identification data to an administrative server associated with XYZ Distributors. When unhitched from the tractor, containers may be stored for a prolonged period of time. The container tracking device may be powered off to conserve battery power. Or, the container tracking device may be remotely activated through a communication of the administrative server, wherein the administrative server requests a location query.

The administrative server may aggregate received data to generate a case table listing the data and an administrative graphical user interface displaying the data on a map. As such, Brian may access a personalized view of the graphical user interface for the purpose of tracking a shipment of containers being distributed by XYZ Distributor.

A client may wish to know the status of the cargo within a particular container being delivered through a land based route. For example, a client may wish to know if the cargo has been loaded or unloaded, or how much cargo a particular container is holding at any given moment. Furthermore, the client may wish to receive an alert if the status of a cargo changes (e.g. receive an alert when unloading has begun, etc.).

In one embodiment, a method may include detecting a cargo event within a container of a transport vehicle, using a cargo sensor. The method may further include determining if a predetermined time interval has elapsed since a last cargo status determination, as well as determining a cargo status using the cargo sensor. A cargo status data is generated, and transmitted to an administrative server through a network using at least one of a tracking device of the container and a tracking device of the transport vehicle. Additionally, the cargo event is at least one of a loading of a cargo and an unloading of a cargo.

In another embodiment, the cargo event may be detected through at least one of a vibration of the container (e.g. using an accelerometer, etc.), a motion within the container (e.g. using a motion detector, infrared, ultrasonic, etc.), a container door opening and/or (e.g. using a pressure switch, a reed switch, etc.), and changes in light intensity observed by a light sensor (e.g. a photodiode, etc.).

In still another embodiment, the predefined time interval may be dynamic, such that it depends upon at least one previous cargo status data. In this way, the predefined time interval may be shorter when the cargo status data is changing rapidly (e.g. giving more updates since interesting things are happening, etc.), and longer when the cargo status data is changing slowly.

In one embodiment, the cargo sensor may include an ultrasound sensing device, and the cargo status may be determined using ultrasound range finding. For example, in one embodiment, an ultrasound range finder may be mounted in the back of the container. When triggered, it may determine the average distance between the sensor and the nearest object, whether the doors at the other end of an empty container, or cargo.

In another embodiment, the cargo sensor may include a digital imaging device (e.g. a camera), and the cargo status may be determined using differential imaging. The process of determining the cargo status using differential imaging may include capturing a photograph of an interior of the container, then comparing the photograph with a baseline photograph of the interior of the container in a known state (e.g. full, empty, etc.). The cargo status may then be determined by comparing the photograph with the baseline photograph. In some embodiments, this comparison may be done using a form of machine vision implemented within the cargo sensor. In other embodiments, the photograph may be transmitted to the administrative server, where the differential imaging analysis would take place using more powerful computational hardware.

In yet another embodiment, the cargo status may be determined using an analysis of signal strength and interference in a radio signal being broadcast from one side of the container to another. This determination may include detecting fluctuations in the radio signal (e.g. noise, signal strength, etc.), and then comparing observed fluctuations with empirical data correlated with various cargo states. For example, it may be determined how much radio interference or attenuation of signal strength is caused by having the container half full of cargo. In some embodiments, the radio signal may also serve an additional purpose (e.g. RFID signal activating passive RFID tags in the cargo or an identification tag within the container itself, etc.).

In some embodiments, the cargo status data is transmitted to the administrative server by itself. In other embodiments, the cargo status data may be transmitted along with other desired data, such as a GPS location. As an option, the cargo status data may be held by at least one of the tracking device of the container and the tracking device of the transport vehicle, until it can be transmitted along with another piece of data (e.g. GPS location, etc.).

In some embodiments, the cargo sensor may have its own power source (e.g. battery, solar panel, thermoelectric generator, etc.). In other embodiments, the cargo sensor may draw its power from at least one of a container tracking device, a chassis tracking device, a transport vehicle tracking device, and the power system of the transport vehicle itself.

In various embodiments, the cargo status may be binary, indicating that the container is either loaded or unloaded. In other embodiments, the cargo status may indicate the fraction of the container which is loaded. In one embodiment, the cargo status data may be transmitted by the cargo sensor itself (e.g. using a cellular modem, etc.). In some embodiments, the cargo sensor may employ multiple sensor technologies to detect a cargo event. In other embodiments, the detection of a cargo event may be performed by another device; upon detection, a wake signal may be sent to the cargo sensor.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and/or software (e.g., embodied in a machine readable medium). For example, the various electrical structure and methods may be embodied using transistors, logic gates, and/or electrical circuits (e.g., application specific integrated (ASIC) circuitry and/or Digital Signal Processor (DSP) circuitry).

In addition, it will be appreciated that the various operations, processes, and/or methods disclosed herein may be embodied in a machine-readable medium and/or a machine accessible medium compatible with a data processing system (e.g., a computer device). Accordingly, the specification and drawings are to be regarded in an illustrative in rather than a restrictive sense.

What is claimed is:

1. A method for monitoring status of a cargo transport container associated with a transport vehicle, the method comprising:
    detecting a cargo event indicating cargo has been loaded into or unloaded from the cargo transport container;
    determining if a predefined time interval has elapsed since a last cargo event detection;
    determining a cargo status indicative of the status of the cargo transport container using a cargo sensor;
    generating cargo status data indicative of the cargo status; and
    transmitting the cargo status data to an administrative server through a network,
    wherein the cargo status data is transmitted from a tracking device of the container or a tracking device of the transport vehicle.

2. The method of claim 1, wherein detection of the cargo event is based on at least one of a vibration of the container, a motion within the container, a container door opening, the container door closing, and changes in light intensity observed by a light sensor.

3. The method of claim 1 wherein the predefined time interval is dynamic, depending on timing of a previous detection of a cargo event, such that the predefined time interval is shorter when cargo events are occurring rapidly, and longer when cargo events are occurring slowly.

4. The method of claim 1 wherein the cargo status data indicates that the cargo transport container is attached to the cargo transport vehicle.

5. The method of claim 1 wherein the cargo status data includes a container identification number of the cargo transport container.

* * * * *